(12) United States Patent
Wiegand et al.

(10) Patent No.: US 10,674,134 B2
(45) Date of Patent: *Jun. 2, 2020

(54) MULTI-VIEW SIGNAL CODEC WITH REUSING CODING PARAMETERS

(71) Applicant: GE VIDEO COMPRESSION, LLC, Albany, NY (US)

(72) Inventors: Thomas Wiegand, Berlin (DE); Detlev Marpe, Berlin (DE); Karsten Mueller, Berlin (DE); Philipp Merkle, Erlangen (DE); Gerhard Tech, Berlin (DE); Hunn Rhee, Berlin (DE); Heiko Schwarz, Berlin (DE)

(73) Assignee: GE VIDEO COMPRESSION, LLC, Albany, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/137,992

(22) Filed: Sep. 21, 2018

(65) Prior Publication Data

US 2019/0028692 A1    Jan. 24, 2019

Related U.S. Application Data

(63) Continuation of application No. 15/386,634, filed on Dec. 21, 2016, now Pat. No. 10,110,903, which is a
(Continued)

(51) Int. Cl.
*H04N 13/00* (2018.01)
*H04N 13/161* (2018.01)
(Continued)

(52) U.S. Cl.
CPC ......... *H04N 13/161* (2018.05); *H04N 19/139* (2014.11); *H04N 19/159* (2014.11);
(Continued)

(58) Field of Classification Search
CPC .. H04N 13/161; H04N 19/176; H04N 19/197; H04N 19/61; H04N 19/597; H04N 19/159; H04N 19/139
See application file for complete search history.

(56) References Cited

U.S. PATENT DOCUMENTS

| 2010/0142614 | A1* | 6/2010 | Pandit | H04N 19/597 375/240.02 |
|---|---|---|---|---|
| 2010/0284466 | A1 | 11/2010 | Pandit | |

(Continued)

FOREIGN PATENT DOCUMENTS

| CN | 101330631 | 12/2008 |
|---|---|---|
| CN | 101669370 | 3/2010 |

(Continued)

OTHER PUBLICATIONS

First Office Action dated Jun. 20, 2019 issued in corresponding Chinese Patent Application No. 201710261052.8 with English translation.

(Continued)

*Primary Examiner* — Richard T Torrente
(74) *Attorney, Agent, or Firm* — Pillsbury Winthrop Shaw Pittman LLP

(57) ABSTRACT

A higher compression rate or better rate/distortion ratio may be achieved by adopting or predicting second coding parameters used for encoding a second view of the multi-view signal from first coding parameters used in encoding a first view of the multi-view signal. In other words, redundancies between views of a multi-view signal are not restricted to the views themselves, such as the video information thereof, but that the coding parameters in encoding these views in parallel show similarities, which may be exploited in order to further improve the coding rate.

20 Claims, 7 Drawing Sheets

Related U.S. Application Data continuation of application No. 13/762,608, filed on Feb. 8, 2013, now Pat. No. 9,648,298, which is a continuation of application No. PCT/EP2011/063852, filed on Aug. 11, 2011.

(60) Provisional application No. 61/372,785, filed on Aug. 11, 2010.

(51) Int. Cl.

| | | |
|---|---|---|
| *H04N 19/597* | (2014.01) | |
| *H04N 19/196* | (2014.01) | |
| *H04N 19/139* | (2014.01) | |
| *H04N 19/61* | (2014.01) | |
| *H04N 19/159* | (2014.01) | |
| *H04N 19/176* | (2014.01) | |

(52) U.S. Cl.
CPC ......... *H04N 19/176* (2014.11); *H04N 19/197* (2014.11); *H04N 19/597* (2014.11); *H04N 19/61* (2014.11)

(56) References Cited

U.S. PATENT DOCUMENTS

| | | | |
|---|---|---|---|
| 2011/0216833 A1 | 9/2011 | Chen | |
| 2012/0114039 A1 | 5/2012 | Wang | |
| 2012/0200669 A1* | 8/2012 | Lai | G06T 5/002 348/43 |

FOREIGN PATENT DOCUMENTS

| | | |
|---|---|---|
| CN | 101690220 | 3/2010 |
| EP | 2149262 | 11/2008 |
| JP | 2000-261808 A | 9/2000 |
| JP | 2009-123219 | 6/2009 |
| JP | 2010-506287 | 2/2010 |
| JP | 2010-508706 | 3/2010 |
| JP | 2010-525724 | 7/2010 |
| JP | 2010-525744 | 7/2010 |
| JP | 2011-509631 | 3/2011 |
| KR | 2010014553 | 2/2010 |
| WO | 2008/041178 | 4/2008 |
| WO | 2008/133455 | 11/2008 |
| WO | 2009091383 | 7/2009 |
| WO | 2009/099510 A1 | 8/2009 |
| WO | 2010/043773 | 4/2010 |

OTHER PUBLICATIONS

First Office Action Chinese Patent Application No. 201710260904.1 dated Jun. 20, 2019 with English translation.
Non-final Office Action U.S. Appl. No. 15/386,634 dated May 26, 2017.
Final Office Action U.S. Appl. No. 13/386,634 dated Feb. 15, 2018.
Office Action dated Nov. 6, 2017 in Korean Patent Application No. 10-2017-7026007.
Office Action dated Jul. 19, 2016, issued in parallel Japanese Patent Application No. 2015-113047, English translation only, 3 pages.
Oh, Han et al., "H.264-Based Depth Map Sequence Coding Using Motion Information of Corresponding Texture Video", Proc. PSIVT 2006, 2006, pp. 898-907.
H.264/AVC Textbook Revised 3rd Version, supervised by S. Okubo, 1st version Impress R&D, 2009, pp. 306-323 cited on p. 4 of Office Action dated Dec. 10, 2013, from Japanese Patent Office (English language version of Office Action attached, cited on p. 4).
ISO/IEC, "ISO/IEC 14496-10:2008/FDAM 1:2008(E) "Information technology—Coding of audio-visual objects—Part 10: Advanced Video Coding Amendment 1: Multiview Video Coding"", International Standard Organization, Geneva, 2010, Oct. 5, 2008, pp. 1-65.
Itu-T and ISO/IEC JTC1, ""Advanced video coding for generic audiovisual services"", ITU-T Recommendation H.264 and ISO/IEC 14496-10 (MPEG-4 AVC), Geneva, Jan. 27, 2009, pp. 1-642.
Jiang, G. et al., "Disparity estimation and compression in multiview video plus disparity maps", ISO/IEC JTC1/SC29/WG11 and ITU-T SG16 0.6, 25th Meeting, Document JVT-Y024, Shenzhen, 2007, pp. 1-9.
Kimata, H. et al., "Inter-view prediction with down-sampled reference pictures", ISO/IEC JTC1/SC29/WG11 and ITUT SG16 0.6, 23rd Meeting, Document JVT-W079, San Jose, 2007, pp. 1-11.
Koo, H.-S. et al., "Motion Information Inferring Scheme for Multi-View Video Coding", IEICE Trans. Commun., E91-B (4), 2008, pp. 1247-1250.
Koo, H.-S. et al., "MVC Motion Skip Mode", ISO/IEC JTC1/SC29/WG11 and ITU-T SG16 0.6, 23rd Meeting, Document Joint Video Team-W081, San Jose, 2007, Apr. 19, 2007, pp. 1-13.
Lie, W.-N. et al., "Intermediate View Synthesis from Binocular Images for Stereoscopic Applications", IEEE International Symposium on Ciruicites and Systems, 5, 2001, pp. 287-290.
Liu, S. et al., "New Depth Coding Techniques With Utilization of Corresponding Video", IEEE Trans. Broadcasting, 57(2), 2001, pp. 551-561.
Liu, X. et al., "3DV/FTV EE3/EE4 Results on Alt Moabit sequence", ISO/IEC JTC1/SC29/WG11, 87th MPEG Meeting, Lausanne, Switzerland, 2009, 16 pages.
Merkle, P. et al., "The effects of multiview depth video compression on multiview rendering", Signal Processing: Image Communication, 24, 2009, pp. 73-88.
Morvan, Y. et al., "Platelet-based coding of depth maps for the transmission of multiview images Proc. SPIE, 6055", 2006, pp. 60550K-1-60550K-12.
Morvan, Y., et al., "Novel Coding Technique for Depth Images using Quadtree Decomposition and Plane Approximation", Proc. SPIE, 5960, 2005, pp. 1187-1194.
Seo, J. et al., "Motion Information Sharing Mode for Depth Video Coding", 3DTV Conference: The True Vision-Capture, Transmission and Display of 3D Video, 2010, pp. 1-4.
Notice of Allowance U.S. Appl. No. 15/386,634 dated Jun. 21, 2018.
Office Action issued Nov. 6, 2017 in Korean Application 10-2017-7026007.
Notification of Reasons for Refusal Japanese Patent Application N. 2018-112539 dated Jul. 30, 2019 with English translation.
First Office Action Chinese Patent Application No. 201710261293.2 dated Jul. 24, 2019 with English translation.
Notice of Allowance dated Aug. 27, 2019 in Korean Application 10-2018-7030649.
Decision to Grant dated Nov. 12, 2019 in Japanese Application 2018-112539.
Office action dated Jan. 9, 2020 in Korean Application 10-2019-7034902.
Notice of Issuance dated Feb. 7, 2020 in Chinese Application 201710261052.8.
Notice of Issuance dated Feb. 7, 2020 in Chinese Application 201710260904.1.
Office Action issued Mar. 10, 2020 in Chinese Application 201710261293.2.

* cited by examiner

MULTI-VIEW SIGNAL CODEC WITH REUSING CODING PARAMETERS

CROSS-REFERENCE TO RELATED APPLICATIONS

This application is a Continuation of U.S. patent application Ser. No. 15/386,634, filed Dec. 21, 2016, which is a Continuation of U.S. patent application Ser. No. 13/762,608, filed Feb. 8, 2013, now U.S. Pat. No. 9,648,298, which is a Continuation of International Application No. PCT/EP2011/063852, filed Aug. 11, 2011, and additionally claims priority from U.S. Application No. 61/372,785, filed Aug. 11, 2010. The subject matter of each of the foregoing applications and patent is incorporated herein by reference in entirety.

BACKGROUND OF THE INVENTION

The present invention relates to coding of multi-view signals.

Multi-view signals are involved in many applications, such as 3D video applications including, for example, stereo and multi-view displays, free viewpoint video applications, etc. For stereo and multi-view video content, the MVC standard has been specified [1, 2]. This standard compresses video sequences from a number of adjacent cameras. The MVC decoding process only reproduces these camera views at their original camera positions. For different multi-view displays however, a different number of views with different spatial positions are necessitated such that additional views, e.g. between the original camera positions, are necessitated.

The difficulty in handling multi-view signals is the huge amount of data necessary to convey information on the multiple views included in the multi-view signal. In case of the just mentioned requirement to enable intermediate view extraction/synthesis, the situation gets even worse, since in this case the videos associated with the individual views may be accompanied by supplementary data such as depth/disparity map data enabling re-projecting the respective view into another view, such as an intermediate view. Owing to the huge amount of data, it is very important to maximize the compression rate of the multi-view signal codec as far as possible.

SUMMARY

According to an embodiment, a decoder may be configured to: reconstruct a first view of a multi-view signal from a data stream by, according to first coding parameters obtained from the data stream, predicting a current portion of the first view from a first previously reconstructed portion of the multi-view signal, reconstructed from the data stream by the decoder prior to the reconstruction of the current portion of the first view and correcting a prediction error of the prediction of the current portion of the first view using first correction data contained in the data stream; at least partially adopt or predict second coding parameters from the first coding parameters; and reconstruct a second view of the multi-view signal from the data stream by, according to the second coding parameters, predicting a current portion of the second view from a second previously reconstructed portion of the multi-view signal, reconstructed from the data stream by the decoder prior to the reconstruction of the current portion of the second view and correcting a prediction error of the prediction of the current portion of the second view using second correction data contained in the data stream.

According to another embodiment, an encoder may be configured to: encode a first view of a multi-view signal into a data stream by determining first coding parameters, according to the first coding parameters, predicting a current portion of the first view from a first previously encoded portion of the multi-view signal, encoded into the data stream by the encoder prior to the encoding of the current portion of the first view, and determining a prediction error of the prediction of the current portion of the first view in order to obtain first correction data, and inserting the first coding parameters and the first correction data into the data stream; encode a second view of the multi-view signal into the data stream by, determining second coding parameters by adopting or predicting the second coding parameters from the first coding parameters; according to the second coding parameters, predicting a current portion of the second view from a second previously encoded portion of the multi-view signal, encoded into the data stream by the encoder prior to the encoding of the current portion of the second view and determining a prediction error of the prediction of the current portion of the second view in order to obtain second correction data contained in the data stream, inserting the second correction data into the data stream.

According to another embodiment, a data stream may have: a first part into which a first view of a multi-view signal is encoded, the first part having first correction parameters and first coding parameters such that, according to the first coding parameters, a current portion of the first view is predictable from a first previously encoded portion of the multi-view signal, encoded into the data stream prior to the current portion of the first view, and a prediction error of the prediction of the current portion of the first view is correctable using the first correction data, and a second part into which a second view of the multi-view signal is encoded, the second part having second correction parameters such that according to second coding parameters predictable from, or adopted from the first coding parameters, a current portion of the second view is predictable from a second previously encoded portion of the multi-view signal, encoded into the data stream prior to the encoding of the current portion of the second view and a prediction error of the prediction of the current portion of the second view is correctable using the second correction data.

According to another embodiment, a decoding method may have the steps of: reconstructing a first view of a multi-view signal from a data stream by, according to first coding parameters obtained from the data stream, predicting a current portion of the first view from a first previously reconstructed portion of the multi-view signal, reconstructed from the data stream by the decoder prior to the reconstruction of the current portion of the first view and correcting a prediction error of the prediction of the current portion of the first view using first correction data contained in the data stream; at least partially adopting or predicting second coding parameters from the first coding parameters; and reconstructing a second view of the multi-view signal from the data stream by, according to the second coding parameters, predicting a current portion of the second view from a second previously reconstructed portion of the multi-view signal, reconstructed from the data stream by the decoder prior to the reconstruction of the current portion of the second view and correcting a prediction error of the prediction of the current portion of the second view using second correction data contained in the data stream.

According to another embodiment, an encoding method may have the steps of: encoding a first view of a multi-view signal into a data stream by determining first coding parameters, according to the first coding parameters, predicting a current portion of the first view from a first previously encoded portion of the multi-view signal, encoded into the data stream by the encoder prior to the encoding of the current portion of the first view, and determining a prediction error of the prediction of the current portion of the first view in order to obtain first correction data, and inserting the first coding parameters and the first correction data into the data stream; and encoding a second view of the multi-view signal into the data stream by, determining second coding parameters by adopting or predicting the second coding parameters from the first coding parameters; according to the second coding parameters, predicting a current portion of the second view from a second previously encoded portion of the multi-view signal, encoded into the data stream by the encoder prior to the encoding of the current portion of the second view and determining a prediction error of the prediction of the current portion of the second view in order to obtain second correction data contained in the data stream, inserting the second correction data into the data stream.

Another embodiment may have a computer program having a program code for performing, when running on a computer, the above methods.

The present application provides embodiments exploiting a finding, according to which a higher compression rate or better rate/distortion ratio may be achieved by adopting or predicting second coding parameters used for encoding a second view of the multi-view signal from first coding parameters used in encoding a first view of the multi-view signal. In other words, the inventors found out that the redundancies between views of a multi-view signal are not restricted to the views themselves, such as the video information thereof, but that the coding parameters in parallely encoding these views show similarities which may be exploited in order to further improve the coding rate.

Some embodiments of the present application additionally exploit a finding according to which the segmentation of a depth/disparity map associated with a certain frame of a video of a certain view, used in coding the depth/disparity map, may be determined or predicted using an edge detected in the video frame as a hint, namely by determining a wedgelet separation line so as to extend along the edge in the video frame. Although the edge detection increases the complexity at the decoder side, the deficiency may be acceptable in application scenarios where low transmission rates at acceptable quality is more important than complexity issues. Such scenarios may involve broadcast applications where the decoders are implemented as stationary devices.

Further, some embodiments of the present application additionally exploit a finding according to which the view the coding parameters of which are adopted/predicted from coding information of another view, may be coded, i.e. predicted and residual-corrected, in at a lower spatial resolution, with thereby saving coded bits, if the adoption/prediction of the coding parameters includes scaling of these coding parameters in accordance with a ratio between the spatial resolutions.

BRIEF DESCRIPTION OF THE DRAWINGS

Embodiments of the present application are described below with respect to the figures among which.

DETAILED DESCRIPTION OF THE INVENTION

Figure 1:
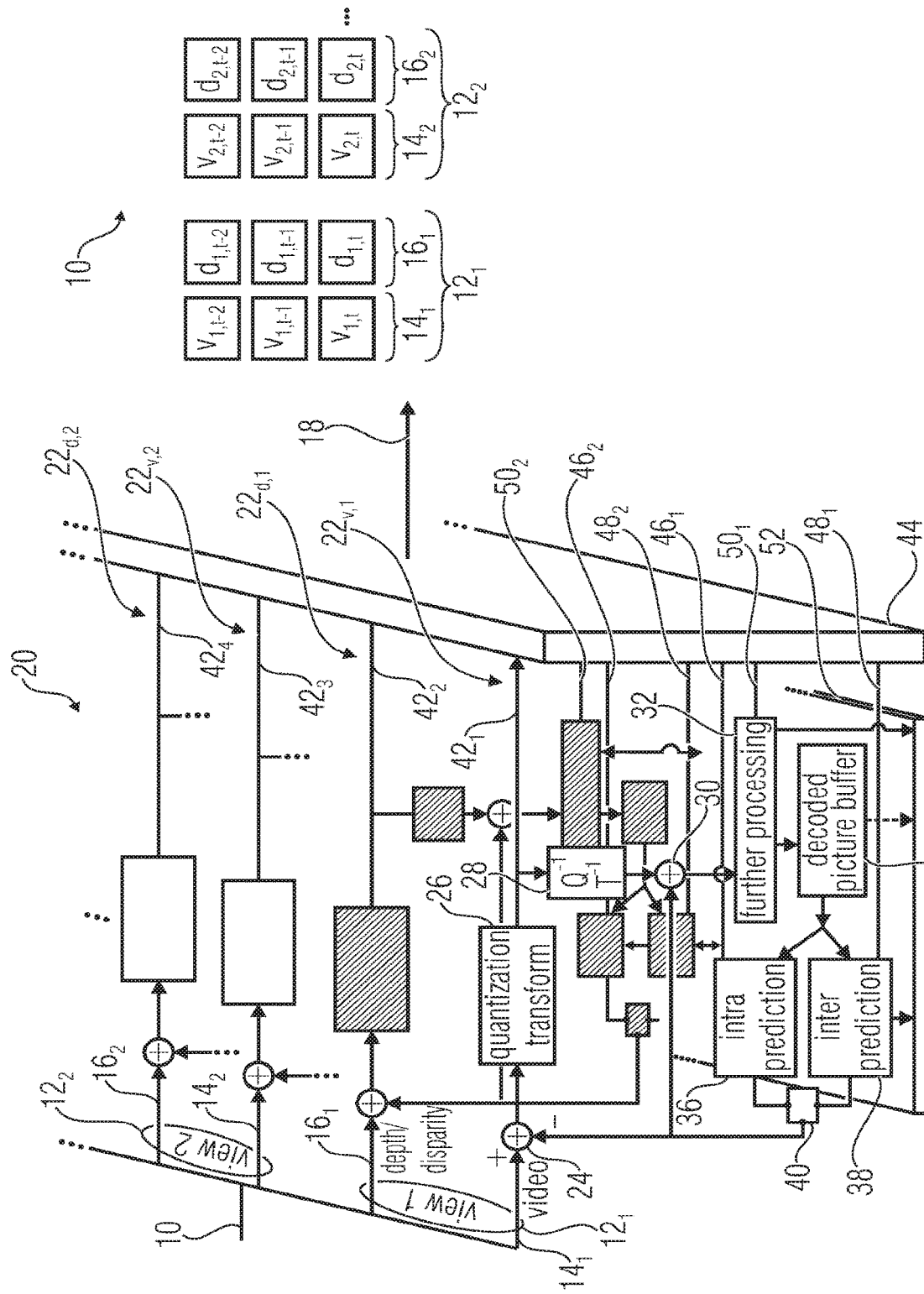
FIG. 1 shows a block diagram of an encoder according to an embodiment.

FIG. 1 shows an encoder for encoding a multi-view signal in accordance with an embodiment. The multi-view signal of FIG. 1 is illustratively indicated at 10 as comprising two views $12_1$ and $12_2$, although the embodiment of FIG. 1 would also be feasible with a higher number of views. Further, in accordance with the embodiment of FIG. 1, each view $12_1$ and $12_2$ comprises a video 14 and depth/disparity map data 16, although many of the advantageous principles of the embodiment described with respect to FIG. 1 could also be advantageous if used in connection with multi-view signals with views not comprising any depth/disparity map data. Such generalization of the present embodiment is described further below subsequent to the description of FIGS. 1 to 3.

The video 14 of the respective views $12_2$ and $12_2$ represent a spatio-temporal sampling of a projection of a common scene along different projection/viewing directions. Advantageously, the temporal sampling rate of the videos 14 of the views $12_1$ and $12_2$ are equal to each other although this constraint does not have to be necessarily fulfilled. As shown in FIG. 1, advantageously each video 14 comprises a sequence of frames with each frame being associated with a respective time stamp t, t−1, t−2, . . . . In FIG. 1 the video frames are indicated by $v_{view\ number,\ time\ stamp\ number}$. Each frame $v_{i,t}$ represents a spatial sampling of the scene i along the respective view direction at the respective time stamp t, and thus comprises one or more sample arrays such as, for example, one sample array for luma samples and two sample arrays with chroma samples, or merely luminance samples or sample arrays for other color components, such as color components of an RGB color space or the like. The spatial resolution of the one or more sample arrays may differ both within one video 14 and within videos 14 of different views $12i$ and $12_2$.

Similarly, the depth/disparity map data 16 represents a spatio-temporal sampling of the depth of the scene objects of the common scene, measured along the respective viewing direction of views $12_1$ and $12_2$. The temporal sampling rate of the depth/disparity map data 16 may be equal to the temporal sampling rate of the associated video of the same view as depicted in FIG. 1, or may be different therefrom. In the case of FIG. 1, each video frame v has associated therewith a respective depth/disparity map d of the depth/disparity map data 16 of the respective view $12i$ and $12_2$. In other words, in the example of FIG. 1, each video frame $v_{i,t}$ of view i and time stamp t has a depth/disparity map $d_{i,t}$ associated therewith. With regard to the spatial resolution of the depth/disparity maps d, the same applies as denoted above with respect to the video frames. That is, the spatial resolution may be different between the depth/disparity maps of different views.

In order to compress the multi-view signal 10 effectively, the encoder of FIG. 1 parallely encodes the views $12_1$ and $12_2$ into a data stream 18, However, coding parameters used for encoding the first view $12_1$ are re-used in order to adopt same as, or predict, second coding parameters to be used in encoding the second view $12_2$. By this measure, the encoder of FIG. 1 exploits the fact discovered by the inventors, according to which parallel encoding of views $12_1$ and $12_2$ results in the encoder determining the coding parameters for these views similarly, so that redundancies between these coding parameters may be exploited effectively in order to increase the compression rate or rate/distortion ratio (with distortion measured, for example, as a mean distortion of both views and the rate measured as a coding rate of the whole data stream 18).

Figure 2:
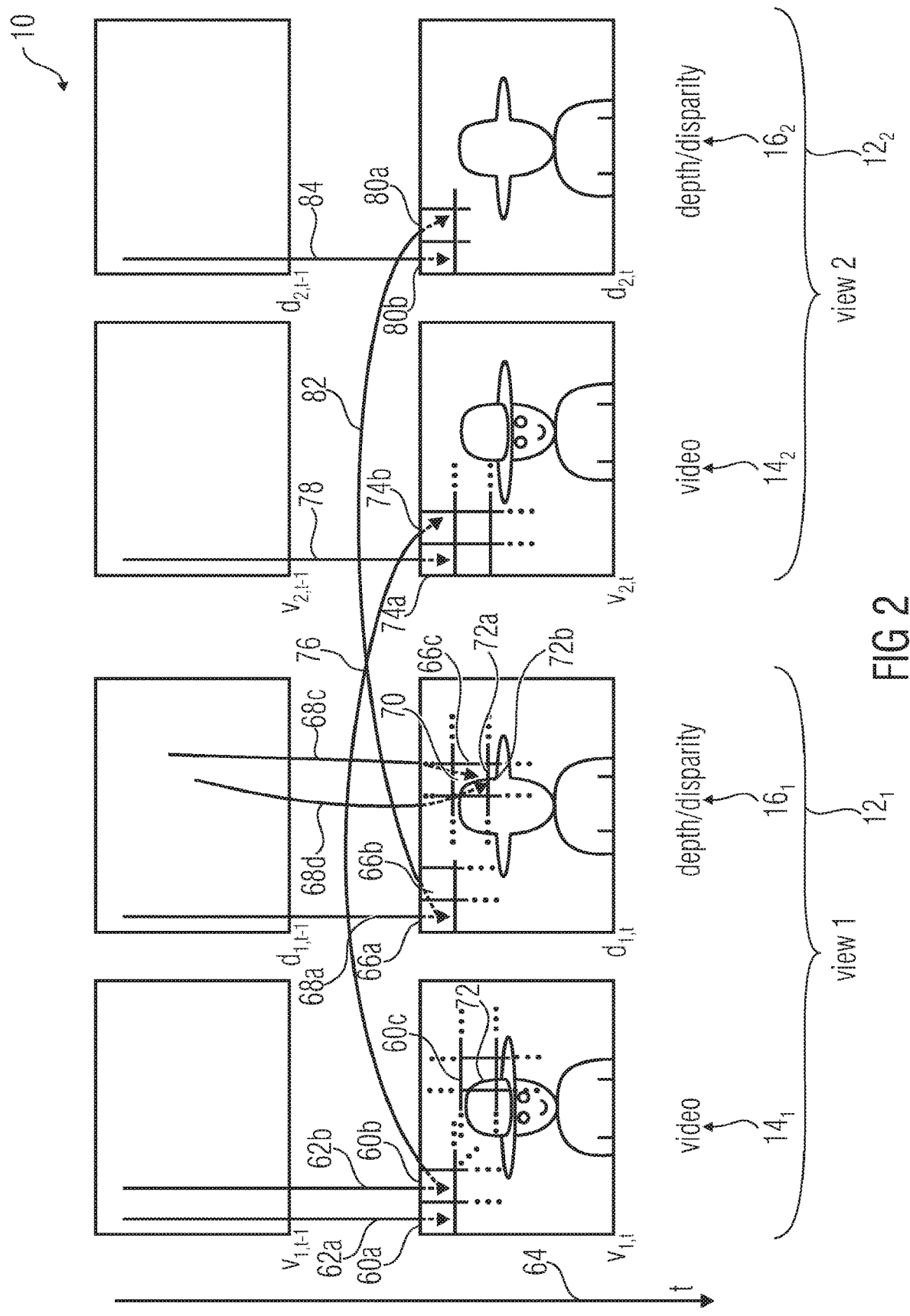
FIG. 2 shows a schematic diagram of a portion of a multi-view signal for illustration of information reuse across views and video depth/disparity boundaries.

In particular, the encoder of FIG. 1 is generally indicated by reference sign 20 and comprises an input for receiving the multi-view signal 10 and an output for outputting the data stream 18. As can be seen in FIG. 2, the encoder 20 of FIG. 1 comprises two coding branches per view $12_1$ and $12_2$, namely one for the video data and the other for the depth/disparity map data. Accordingly, the encoder 20 comprises a coding branch $22_{v,1}$ for the video data of view 1, a coding branch $22_{d,1}$ for the depth disparity map data of view 1, a coding branch $22_{v,2}$ for the video data of the second view and a coding branch $22_{d,2}$ for the depth/disparity map data of the second view. Each of these coding branches 22 is constructed similarly. In order to describe the construction and functionality of encoder 20, the following description starts with the construction and functionality of coding branch $22_{v,1}$. This functionality is common to all branches 22. Afterwards, the individual characteristics of the branches 22 are discussed.

The coding branch $22_{v,1}$ is for encoding the video $14_1$ of the first view $12_1$ of the multi-view signal 12, and accordingly branch $22_{v,1}$ has an input for receiving the video $14_1$. Beyond this, branch $22_{v,1}$ comprises, connected in series to each other in the order mentioned, a subtracter 24, a quantization/transform module 26, a requantization/inverse-transform module 28, an adder 30, a further processing module 32, a decoded picture buffer 34, two prediction modules 36 and 38 which, in turn, are connected in parallel to each other, and a combiner or selector 40 which is connected between the outputs of the prediction modules 36 and 38 on the one hand the inverting input of subtracter 24 on the other hand. The output of combiner 40 is also connected to a further input of adder 30. The non-inverting input of subtracter 24 receives the video 14i.

The elements 24 to 40 of coding branch $22_{v,1}$ cooperate in order to encode video $14_1$. The encoding encodes the video $14_1$ in units of certain portions. For example, in encoding the video $14_1$, the frames $v_{1,k}$ are segmented into segments such as blocks or other sample groups. The segmentation may be constant over time or may vary in time. Further, the segmentation may be known to encoder and decoder by default or may be signaled within the data stream 18. The segmentation may be a regular segmentation of the frames into blocks such as a non-overlapping arrangement of blocks in rows and columns, or may be a quad-tree based segmentation into blocks of varying size. A currently encoded segment of video $14_1$ entering at the non-inverting input of subtracter 24 is called a current portion of video $14_1$ in the following description.

Prediction modules 36 and 38 are for predicting the current portion and to this end, prediction modules 36 and 38 have their inputs connected to the decoded picture buffer 34. In effect, both prediction modules 36 and 38 use previously reconstructed portions of video $14_1$ residing in the decoded picture buffer 34 in order to predict the current portion/segment entering the non-inverting input of subtracter 24. In this regard, prediction module 36 acts as an intra predictor spatially predicting the current portion of video 14i from spatially neighboring, already reconstructed portions of the same frame of the video 14i, whereas the prediction module 38 acts as an inter predictor temporally predicting the current portion from previously reconstructed frames of the video $14_1$. Both modules 36 and 38 perform their predictions in accordance with, or described by, certain prediction parameters. To be more precise, the latter parameters are determined be the encoder 20 in some optimization framework for optimizing some optimization aim such as optimizing a rate/distortion ratio under some, or without any, constraints such as maximum bitrate.

For example, the intra prediction module 36 may determine spatial prediction parameters for the current portion such as a prediction direction along which content of neighboring, already reconstructed portions of the same frame of video $14_1$ is expanded/copied into the current portion to predict the latter. The inter prediction module 38 may use motion compensation so as to predict the current portion from previously reconstructed frames and the inter prediction parameters involved therewith may comprise a motion vector, a reference frame index, a motion prediction subdivision information regarding the current portion, a hypothesis number or any combination thereof. The combiner 40 may combine one or more of predictions provided by modules 36 and 38 or select merely one thereof. The combiner or selector 40 forwards the resulting prediction of the current portion to the inserting input of subtractor 24 and the further input of adder 30, respectively.

At the output of subtractor 24, the residual of the prediction of the current portion is output and quantization/transform module 36 is configured to transform this residual signal with quantizing the transform coefficients. The transform may be any spectrally decomposing transform such as a DCT. Due to the quantization, the processing result of the quantization/transform module 26 is irreversible. That is, coding loss results. The output of module 26 is the residual signal $42_1$ to be transmitted within the data stream. The residual signal $42_1$ is dequantized and inverse transformed in module 28 so as to reconstruct the residual signal as far as possible, i.e. so as to correspond to the residual signal as output by subtracter 24 despite the quantization noise. Adder 30 combines this reconstructed residual signal with the prediction of the current portion by summation. Other combinations would also be feasible. For example, the subtractor 24 could operate as a divider for measuring the residuum in ratios, and the adder could be implemented as a multiplier to reconstruct the current portion, in accordance with an alternative. The output of adder 30, thus, represents a preliminary reconstruction of the current portion. Further processing, however, in module 32 may optionally be used to enhance the reconstruction. Such further processing may, for example, involve deblocking, adaptive filtering and the like. All reconstructions available so far are buffered in the decoded picture buffer 34. Thus, the decoded picture buffer 34 buffers previously reconstructed frames of video $14_1$ and previously reconstructed portions of the current frame which the current portion belongs to.

In order to enable the decoder to reconstruct the multi-view signal from data stream 18, quantization/transform module 26 forwards the residual signal $42_1$ to a multiplexer 44 of encoder 20. Concurrently, prediction module 36 forwards intra prediction parameters $46_1$ to multiplexer 44, inter prediction module 38 forwards inter prediction parameters $48_1$ to multiplexer 44 and further processing module 32 forwards further-processing parameters $50_1$ to multiplexer 44 which, in turn, multiplexes or inserts all this information into data stream 18.

As became clear from the above discussion in accordance with the embodiment of FIG. 1, the encoding of video $14_1$ by coding branch $22_{v,1}$ is self-contained in that the encoding is independent from the depth/disparity map data $16_1$ and the data of any of the other views $12_2$. From a more general point of view, coding branch $22_{v,1}$ may be regarded as encoding video $14_1$ into the data stream 18 by determining coding parameters and, according to the first coding parameters, predicting a current portion of the video $14_1$ from a previously encoded portion of the video $14_1$, encoded into the data stream 18 by the encoder 20 prior to the encoding of the current portion, and determining a prediction error of the prediction of the current portion in order to obtain correction data, namely the above-mentioned residual signal $42_1$. The coding parameters and the correction data are inserted into the data stream 18.

The just-mentioned coding parameters inserted into the data stream 18 by coding branch $22_{v,1}$ may involve one, a combination or, or all of the following:

First, the coding parameters for video $14_1$ may define/signal the segmentation of the frames of video $14_1$ as briefly discussed before.

Further, the coding parameters may comprise coding mode information indicating for each segment or current portion, which coding mode is to be used to predict the respective segment such as intra prediction, inter prediction, or a combination thereof.

The coding parameters may also comprise the just-mentioned prediction parameters such as intra prediction parameters for portions/segments predicted by intra prediction, and inter prediction parameters for inter predicted portions/segments.

The coding parameters may, however, additionally comprise further-processing parameters $50_1$ signalling to the decoding side how to further process the already reconstructed portions of video $14_1$ before using same for predicting the current or following portions of video $14_1$. These further processing parameters $50i$ may comprise indices indexing respective filters, filter coefficients or the like.

The prediction parameters $46_1$, $48_1$ and the further processing parameters $50_1$ may even additionally comprise sub-segmentation data in order to define a further sub-segmentation relative to the afore-mentioned segmentation defining the granularity of the mode selection, or defining a completely independent segmentation such as for the appliance of different adaptive filters for different portions of the frames within the further-processing.

Coding parameters may also influence the determination of the residual signal and thus, be part of the residual signal $42_1$. For example, spectral transform coefficient levels output by quantization/transform module 26 may be regarded as correction data, whereas the quantization step size may be signalled within the data stream 18 as well, and the quantization step size parameter may be regarded as a coding parameter in the sense of the description brought forward below.

The coding parameters may further define prediction parameters defining a second-stage prediction of the prediction residual of the first prediction stage discussed above. Intra/inter prediction may be used in this regard.

In order to increase the coding efficiency, encoder 20 comprises a coding information exchange module 52 which receives all coding parameters and further information influencing, or being influenced by, the processing within modules 36, 38 and 32, for example, as illustratively indicated by vertically extending arrows pointing from the respective modules down to coding information exchange module 52. The coding information exchange module 52 is responsible for sharing the coding parameters and optionally further coding information among the coding branches 22 so that the branches may predict or adopt coding parameters from each other. In the embodiment of FIG. 1, an order is defined among the data entities, namely video and depth/disparity map data, of the views $12_1$ and $12_2$ of multi-view signal 10 to this end. In particular, the video $14_1$ of the first view $12_1$ precedes the depth/disparity map data $16_1$ of the first view followed by the video $14_2$ and then the depth/disparity map data $16_2$ of the second view $12_2$ and so forth. It should be noted here that this strict order among the data entities of multi-view signal 10 does not need to be strictly applied for the encoding of the entire multi-view signal 10, but for the sake of an easier discussion, it is assumed in the following that this order is constant. The order among the data entities, naturally, also defines an order among the branches 22 which are associated therewith.

As already denoted above, the further coding branches 22 such as coding branch $22_{d,1}$, $22_{v,2}$ and $22_{d,2}$ act similar to coding branch $22_{v,1}$ in order to encode the respective input $16_1$, $14_2$ and $16_2$, respectively. However, due to the just-mentioned order among the videos and depth/disparity map data of views $12_1$ and $12_2$, respectively, and the corresponding order defined among the coding branches 22, coding branch $22_{d,1}$ has, for example, additional freedom in predicting coding parameters to be used for encoding current portions of the depth/disparity map data $16_1$ of the first view $12_1$. This is because of the afore-mentioned order among video and depth/disparity map data of the different views: For example, each of these entities is allowed to be encoded using reconstructed portions of itself as well as entities thereof preceding in the afore-mentioned order among these data entities. Accordingly, in encoding the depth/disparity map data $16_1$, the coding branch $22_{d,1}$ is allowed to use information known from previously reconstructed portions of the corresponding video $14_1$. How branch $22_{d,1}$ exploits the reconstructed portions of the video in order to predict some property of the depth/disparity map data $16_1$, which enables a better compression rate of the compression of the depth/disparity map data $16_1$, is described in more detail below. Beyond this, however, coding branch $22_{d,1}$ is able to predict/adopt coding parameters involved in encoding video $14_1$ as mentioned above, in order to obtain coding parameters for encoding the depth/disparity map data $16_1$. In case of adoption, the signaling of any coding parameters regarding the depth/disparity map data $16_1$ within the data stream 18 may be suppressed. In case of prediction, merely the prediction residual/correction data regarding these coding parameters may have to be signaled within the data stream 18. Examples for such prediction/adoption of coding parameters is described further below, too.

Additional prediction capabilities are present for the subsequent data entities, namely video and the depth/disparity map data $16_2$ of the second view $12_2$. Regarding these coding branches, the inter prediction module thereof is able to not only perform temporal prediction, but also inter-view prediction. The corresponding inter prediction parameters comprise similar information as compared to temporal prediction, namely per interview predicted segment, a disparity vector, a view index, a reference frame index and/or an indication of a number of hypotheses, i.e. the indication of a number of inter predictions participating in forming the inter-view inter prediction by way of summation, for example. Such inter-view prediction is available not only for branch $22_{v,2}$ regarding the video $14_2$, but also for the inter prediction module 38 of branch $22_{d,2}$ regarding the depth/disparity map data $16_2$. Naturally, these inter-view prediction parameters also represent coding parameters which may serve as a basis for adoption/prediction for subsequent view data of a possible third view which is, however, not shown in FIG. 1.

Due to the above measures, the amount of data to be inserted into the data stream 18 by multiplexer 44 is further lowered. In particular, the amount of coding parameters of coding branches $22_{d,1}$, $22_{v,2}$ and $22_{d,2}$ may be greatly reduced by adopting coding parameters of preceding coding branches or merely inserting prediction residuals relative thereto into the data stream 28 via multiplexer 44. Due to the ability to choose between temporal and interview prediction, the amount of residual data $42_3$ and $42_4$ of coding branches $22_{v,2}$ and $22_{d,2}$ may be lowered, too. The reduction in the amount of residual data over-compensates the additional coding effort in differentiating temporal and inter-view prediction modes.

In order to explain the principles of coding parameter adoption/prediction in more detail, reference is made to FIG. 2. FIG. 2 shows an exemplary portion of the multi-view signal 10. FIG. 2 illustrates video frame $v_{1,t}$ as being segmented into segments or portions 60a, 60b and 60c. For simplification reasons, only three portions of frame $v_{1,t}$ are shown, although the segmentation may seamlessly and gaplessly divide the frame into segments/portions. As mentioned before, the segmentation of video frame $v_{1,t}$ may be fixed or vary in time, and the segmentation may be signaled within the data stream or not. FIG. 2 illustrates that portions 60a and 60b are temporally predicted using motion vectors 62a and 62b from a reconstructed version of any reference frame of video $14_1$, which in the present case is exemplarily frame $v_{1,t-1}$. As known in the art, the coding order among the frames of video $14_1$ may not coincide with the presentation order among these frames, and accordingly the reference frame may succeed the current frame $v_{1,t}$ in presentation time order 64. Portion 60c is, for example, an intra predicted portion for which intra prediction parameters are inserted into data stream 18.

In encoding the depth/disparity map di t the coding branch $22_{d,i}$ may exploit the above-mentioned possibilities in one or more of the below manners exemplified in the following with respect to FIG. 2.

For example, in encoding the depth/disparity map $d_{1,t}$, coding branch $22_{d,1}$ may adopt the segmentation of video frame $v_{1,t}$ as used by coding branch $22_{v,1}$. Accordingly, if there are segmentation parameters within the coding parameters for video frame $v_{1,t}$, the retransmission thereof for depth/disparity map data $d_{1,t}$ may be avoided. Alternatively, coding branch $22_{d,1}$ may use the segmentation of video frame $v_{1,t}$ as a basis/prediction for the segmentation to be used for depth/disparity map $d_{1,t}$ with signalling the deviation of the segmentation relative to video frame $v_{1,t}$ via the data stream 18. FIG. 2 illustrates the case that the coding branch $22_{d,1}$ uses the segmentation of video frame $v_1$ as a pre-segmentation of depth/disparity map $d_{1,t}$. That is, coding branch $22_{d,1}$ adopts the pre-segmentation from the segmentation of video $v_{1,t}$ or predicts the pre-segmentation therefrom.

Further, coding branch $22_{d,1}$ may adopt or predict the coding modes of the portions 66a, 66b and 66c of the depth/disparity map $d_{1,t}$ from the coding modes assigned to the respective portion 60a, 60b and 60c in video frame $v_{1,t}$. In case of a differing segmentation between video frame $v_{1,t}$ and depth/disparity map $d_{1,t}$, the adoption/prediction of coding modes from video frame $v_{1,t}$ may be controlled such that the adoption/prediction is obtained from co-located portions of the segmentation of the video frame $v_{1,t}$. An appropriate definition of co-location could be as follows. The co-located portion in video frame $v_{1,t}$ for a current portion in depth/disparity map $d_{1,t}$, may, for example, be the one comprising the co-located position at the upper left corner of the current frame in the depth/disparity map $d_{1,t}$. In case of prediction of the coding modes, coding branch 22,1,1 may signal the coding mode deviations of the portions 66a to 66c of the depth/disparity map $d_{1,t}$ relative to the coding modes within video frame $v_{1,t}$ explicitly signalled within the data stream 18.

As far as the prediction parameters are concerned, the coding branch $22_{d,1}$ has the freedom to spatially adopt or predict prediction parameters used to encode neighbouring portions within the same depth/disparity map $d_{1,t}$ or to adopt/predict same from prediction parameters used to encode co-located portions 60a to 6c of video frame $v_{1,t}$. For example, FIG. 2 illustrates that portion 66a of depth/disparity map $d_{1,t}$ is an inter predicted portion, and the corresponding motion vector 68 a may be adopted or predicted from the motion vector 62a of the co-located portion 60a of video frame $v_{1,t}$. In case of prediction, merely the motion vector difference is to be inserted into the data stream 18 as part of inter prediction parameters $48_2$.

In terms of coding efficiency, it might be favourable for the coding branch $22_{d,i}$ to have the ability to subdivide segments of the pre-segmentation of the depth/disparity map $d_{1,t}$ using a so called wedgelet separation line 70 with signalling the location of this wedgelet separation line 70 to the decoding side within data stream 18. By this measure, in the example of FIG. 2, the portion 66c of depth/disparity map $d_{1,t}$ is subdivided into two wedgelet-shaped portions 72a and 72b. Coding branch $22_{d,1}$ may be configured to encode these sub-segments 72a and 72b separately. In the case of FIG. 2, both sub-segments 72a and 72b are exemplarily inter predicted using respective motion vectors 68c and 68d. In case of using intra prediction for both sub-segments 72a and 72b, a DC value for each segment may be derived by extrapolation of the DC values of neighbouring causal segments with the option of refining each of these derived DC values by transmitting a corresponding refinement DC value to the decoder as an intra prediction parameter. Several possibilities exist in order to enable the decoder to determined the wedgelet separation lines having been used be the encoder to sub-subdivide the pre-segmentation of the depth/disparity map. The coding branch $22_{d,1}$ may be configured to use any of these possibilities exclusively. Alternatively, the coding branch $22_{d,1}$ may have the freedom to choose between the following coding options, and to signal the choice to the decoder as side information within the data stream 18:

The wedgelet separation line 70 may, for example, be a straight line. The signaling of the location of this line 70 to the decoding side may involve the signaling of one intersection point along the border of segment 66c along with a slope or gradient information or the indication of the two intersection points of the wedgelet separation line 70 with the border of segment 66c. In an embodiment, the wedgelet separation line 70 may be signaled explicitly within the data stream by indication of the two intersection points of the wedgelet separation line 70 with the border of segment 66c, where the granularity of the grid indicating possible intersection points, i.e. the granularity or resolution of the indication of the intersection points, may depend on the size of the segment 66c or coding parameters like, e.g., the quantization parameter.

In an alternative embodiment, where the pre-segmentation is given by, e.g., a quadtree-based block partitioning using dyadic square blocks, the permissible set of intersection points for each block size may be given as a look-up table (LUT) such that the signaling of each intersection point involves the signaling of a corresponding LUT index.

In accordance with even another possibility, however, the coding branch $22_{d,1}$ uses the reconstructed portion 60c of the video frame V|in the decoded picture buffer 34 in order to predict the location of the wedgelet separation line 70 with signaling within the data stream, if ever, a deviation of the wedgelet separation line 70 actually to be used in encoding segment 66c, to the decoder. In particular, module 52 may perform an edge detection on the video $v_{1,t}$ at a location corresponding to the location of portion 66c in depth/disparity map $d_{1,t}$. For example, the detection may be sensitive to edges in the video frame $v_{1,t}$ where the spatial gradient of some interval scaled feature such as the brightness, the luma component or a chroma component or chrominance or the like, exceeds some minimum threshold. Based on the location of this edge 72, module 52 could determine the wedgelet separation line 70 such that same extends along edge 72. As the decoder also has access to the reconstructed video frame $v_{1,t}$, the decoder is able to likewise determine the wedgelet separation line 70 so as to subdivide portion 66c into wedgelet-shaped sub-portions 72a and 72b. Signaling capacity for signaling the wedgelet separation line 70 is, therefore, saved. The aspect of having a portion 66c size dependent resolution for representing the wedgelet separation line location could also apply for the present aspect of determining the location of line 70 by edge detection, and for transmitting the optional deviation from the predicted location.

In encoding the video $14_2$, the coding branch $22_{v,2}$ has, in addition to the coding mode options available for coding branch $22_{v,1}$, the option of inter-view prediction.

FIG. 2 illustrates, for example, that a portion 64b of the segmentation of the video frame $v_{2,t}$ is inter-view predicted from the temporally corresponding video frame $v_{1,t}$ of first view video $14_1$ using a disparity vector 76.

Despite this difference, coding branch $22_{v,2}$ may additionally exploit all of the information available form the encoding of video frame $v_{1,t}$ and depth/disparity map $d_{1,t}$ such as, in particular, the coding parameters used in these encodings. Accordingly, coding branch $22_{v,2}$ may adopt or predict the motion parameters including motion vector 78 for a temporally inter predicted portion 74a of video frame $V_{2,t}$ from any or, or a combination of, the motion vectors 62a and 68a of co-located portions 60a and 66a of the temporally aligned video frame $v_{1,t}$ and depth/disparity map $d_{1,t}$ respectively. If ever, a prediction residual may be signaled with respect to the inter prediction parameters for portion 74a. In this regard, it should be recalled that the motion vector 68a may have already been subject to prediction/adoption from motion vector 62a itself.

The other possibilities of adopting/predicting coding parameters for encoding video frame $v_{2,t}$ as described above with respect to the encoding of depth/disparity map $d_{1,t}$, are applicable to the encoding of the video frame $v_{2,t}$ by coding branch $22_{v,2}$ as well, with the available common data distributed by module 52 being, however, increased because the coding parameters of both the video frame $v_{1,t}$ and the corresponding depth/disparity map $d_{1,t}$ are available.

Then, coding branch $22_{d,2}$ encodes the depth/disparity map $d_{2,t}$ similarly to the encoding of the depth/disparity map $d_{1,t}$ by coding branch $22_{d,1}$. This is true, for example, with respect to all of the coding parameter adoption/prediction occasions from the video frame $v_{2,t}$ of the same view $12_2$. Additionally, however, coding branch $22_{d,2}$ has the opportunity to also adopt/predict coding parameters from coding parameters having been used for encoding the depth/disparity map $d_{1,t}$ of the preceding view $12_1$. Additionally, coding branch $22_{d,2}$ may use inter-view prediction as explained with respect to the coding branch $22_{v,2}$.

With regard to the coding parameter adoption/prediction, it may be worthwhile to restrict the possibility of the coding branch $22_{d,2}$ to adopt/predict its coding parameters from the coding parameters of previously coded entities of the multi-view signal 10 to the video $14_2$ of the same view $12_2$ and the depth/disparity map data $16_1$ of the neighboring, previously coded view $12_1$ in order to reduce the signaling overhead stemming from the necessity to signal to the decoding side within the data stream 18 the source of adoption/prediction for the respective portions of the depth/disparity map $d_{2,t}$. For example, the coding branch $22_{d,2}$ may predict the prediction parameters for an interview predicted portion 80a of depth/disparity map $d_{2,t}$ including disparity vector 82 from the disparity vector 76 of the co-located portion 74b of video frame $v_{2,t}$. In this case, an indication of the data entity from which the adoption/prediction is conducted, namely video $14_2$ in the case of FIG. 2, may be omitted since video $14_2$ is the only possible source for disparity vector adoption/prediction for depth/disparity map $d_{2,t}$. In adopting/predicting the inter prediction parameters of a temporally inter predicted portion 80b, however, the coding branch $22_{d,2}$ may adopt/predict the corresponding motion vector 84 from anyone of motion vectors 78, 68a and 62a and accordingly, coding branch $22_{d,2}$ may be configured to signal within the data stream 18 the source of adoption/prediction for motion vector 84. Restricting the possible sources to video $14_2$ and depth/disparity map $16_1$ reduces the overhead in this regard.

Regarding the separation lines, the coding branch $22_{d,2}$ has the following options in addition to those already discussed above:

For coding the depth/disparity map $d_{2,t}$ of view $12_2$ by using a wedgelet separation line, the corresponding disparity-compensated portions of signal $d_{1,t}$ can be used, such as by edge detection and implicitly deriving the corresponding wedgelet separation line. Disparity compensation is then used to transfer the detected line in depth/disparity map $d_{1,t}$ to depth/disparity map $d_{2,t}$. For disparity compensation the foreground depth/disparity values along the respective detected edge in depth/disparity map $d_{1,t}$ may be used.

Alternatively, for coding the depth/disparity map $d_{2,t}$ of view $12_2$ by using a wedgelet separation line, the corresponding disparity-compensated portions of signal $d_{1,t}$ can be used, by using a given wedgelet separation line in the disparity-compensated portion of $d_{1,t}$, i.e. using a wedgelet separation line having been used in coding a co-located portion of the signal di t as a predictor or adopting same.

After having described the encoder 20 of FIG. 1, it should be noted that same may be implemented in software, hardware or firmware, i.e. programmable hardware. Although the block diagram of FIG. 1 suggests that encoder 20 structurally comprises parallel coding branches, namely one coding branch per video and depth/disparity data of the multi-view signal 10, this does not need to be the case. For example, software routines, circuit portions or programmable logic portions configured to perform the tasks of elements 24 to 40, respectively, may be sequentially used to fulfill the tasks for each of the coding branches. In parallel processing, the processes of the parallel coding branches may be performed on parallel processor cores or on parallel running circuitries.

Figure 3:
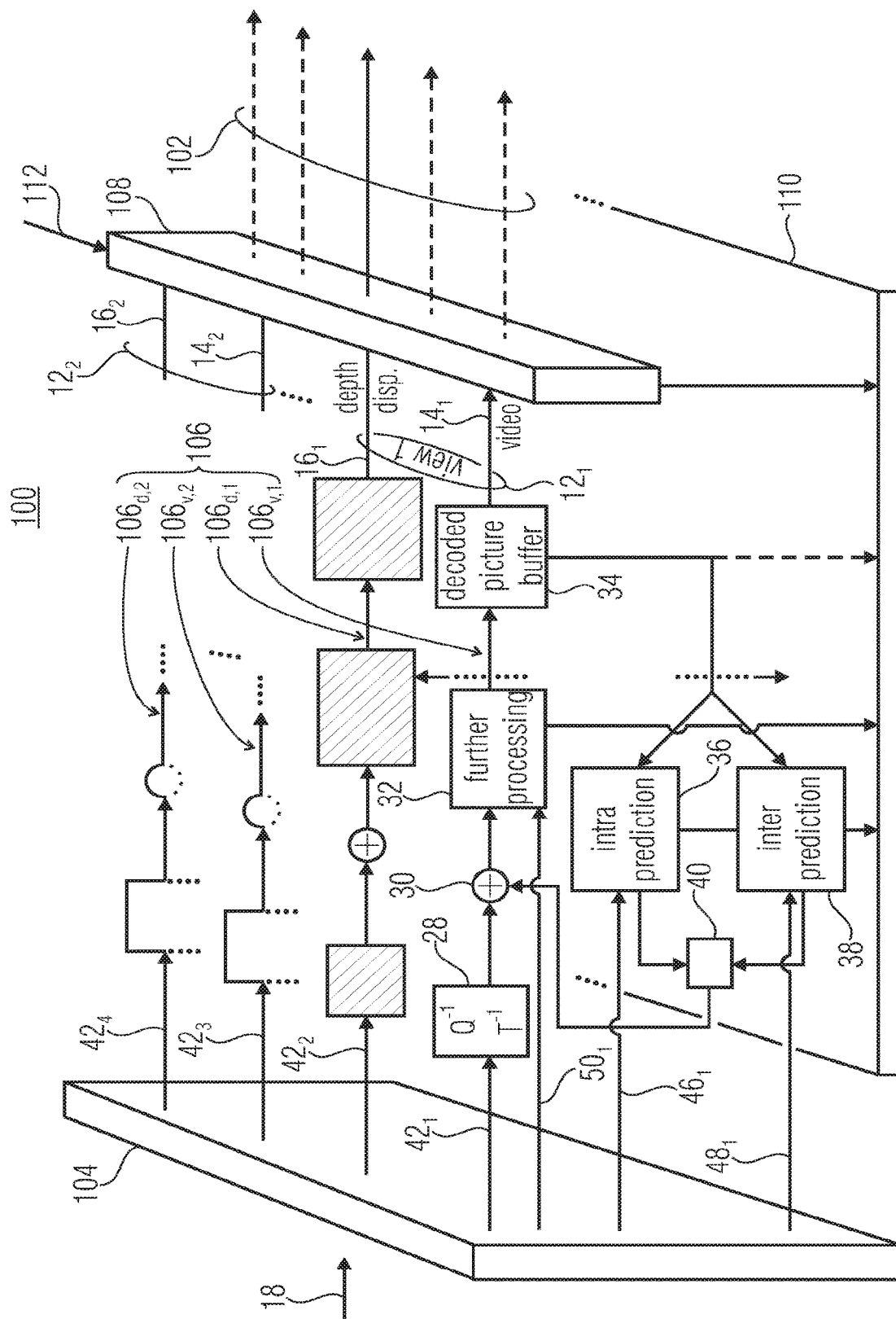
FIG. 3 shows a block diagram of a decoder according to an embodiment.

FIG. 3 shows an example for a decoder capable of decoding data stream 18 so as to reconstruct one or several view videos corresponding to the scene represented by the multi-view signal from the data stream 18. To a large extent, the structure and functionality of the decoder of FIG. 3 is similar to the encoder of FIG. 20 so that reference signs of FIG. 1 have been re-used as far as possible to indicate that the functionality description provided above with respect to FIG. 1 also applies to FIG. 3.

The decoder of FIG. 3 is generally indicated with reference sign 100 and comprises an input for the data stream 18 and an output for outputting the reconstruction of the aforementioned one or several views 102. The decoder 100 comprises a demultiplexer 104 and a pair of decoding branches 106 for each of the data entities of the multi-view signal 10 (FIG. 1) represented by the data stream 18 as well as a view extractor 108 and a coding parameter exchanger 110. As it was the case with the encoder of FIG. 1, the decoding branches 106 comprise the same decoding elements in a same interconnection, which are, accordingly, representatively described with respect to the decoding branch $106v,i$ responsible for the decoding of the video $14_1$ of the first view $12_1$. In particular, each coding branch 106 comprises an input connected to a respective output of the multiplexer 104 and an output connected to a respective input of view extractor 108 so as to output to view extractor 108 the respective data entity of the multi-view signal 10, i.e. the video $14_1$ in case of decoding branch $106_{v,1}$. In between, each coding branch 106 comprises a dequantization/inverse-transform module 28, an adder 30, a further processing module 32 and a decoded picture buffer 34 serially connected between the multiplexer 104 and view extractor 108. Adder 30, further-processing module 32 and decoded picture buffer 34 form a loop along with a parallel connection of prediction modules 36 and 38 followed by a combiner/selector 40 which are, in the order mentioned, connected between decoded picture buffer 34 and the further input of adder 30. As indicated by using the same reference numbers as in the case of FIG. 1, the structure and functionality of elements 28 to 40 of the decoding branches 106 are similar to the corresponding elements of the coding branches in FIG. 1 in that the elements of the decoding branches 106 emulate the processing of the coding process by use of the information conveyed within the data stream 18. Naturally, the decoding branches 106 merely reverse the coding procedure with respect to the coding parameters finally chosen by the encoder 20, whereas the encoder 20 of FIG. 1 has to find an optimum set of coding parameters in some optimization sense such as coding parameters optimizing a rate/distortion cost function with, optionally, being subject to certain constraints such as maximum bit rate or the like.

The demultiplexer 104 is for distributing the data stream 18 to the various decoding branches 106. For example, the demultiplexer 104 provides the dequantization/inverse-transform module 28 with the residual data $42 1$, the further processing module 32 with the further-processing parameters $50_1$, the intra prediction module 36 with the intra prediction parameters $46_1$ and the inter prediction module 38 with the inter prediction modules $48_1$. The coding parameter exchanger 110 acts like the corresponding module 52 in FIG. 1 in order to distribute the common coding parameters and other common data among the various decoding branches 106.

The view extractor 108 receives the multi-view signal as reconstructed by the parallel decoding branches 106 and extracts therefrom one or several views 102 corresponding to the view angles or view directions prescribed by externally provided intermediate view extraction control data 112.

Due to the similar construction of the decoder 100 relative to the corresponding portion of the encoder 20, its functionality up to the interface to the view extractor 108 is easily explained analogously to the above description.

In fact, decoding branches $106_{v,i}$ and $106_{d,i}$ act together to reconstruct the first view $12_1$ of the multi-view signal 10 from the data stream 18 by, according to first coding parameters contained in the data stream 18 (such as scaling parameters within $42_1$, the parameters $46_1$, $48_1$, $50_1$, and the corresponding non-adopted ones, and prediction residuals, of the coding parameters of the second branch $16_{d,i}$, namely $42_2$, parameters $46_2$, $48_2$, $50_2$), predicting a current portion of the first view $12_1$ from a previously reconstructed portion of the multi-view signal 10, reconstructed from the data stream 18 prior to the reconstruction of the current portion of the first view $12_1$ and correcting a prediction error of the prediction of the current portion of the first view $12_1$ using first correction data, i.e. within $42_1$ and $42_2$, also contained in the data stream 18. While decoding branch $106_{v,i}$ is responsible for decoding the video $14_1$, a coding branch $106_{d,i}$ assumes responsibility for reconstructing the depth/disparity map data $16_1$. See, for example, FIG. 2: The decoding branch $106_{v,i}$ reconstructs the video $14_1$ of the first view $12_1$ from the data stream 18 by, according to corresponding coding parameters read from the data stream 18, i.e. scaling parameters within $42_1$, the parameters $46_1$, $48_1$, $50_1$, predicting a current portion of the video $14_1$ such as $60a$, $60b$ or $60c$ from a previously reconstructed portion of the multi-view signal 10 and correcting a prediction error of this prediction using corresponding correction data obtained from the data stream 18, i.e. from transform coefficient levels within $42_1$. For example, the decoding branch $106v,i$ processes the video $14_1$ in units of the segments/portions using the coding order among the video frames and, for coding the segments within the frame, a coding order among the segments of these frames as the corresponding coding branch of the encoder did. Accordingly, all previously reconstructed portions of video $14_1$ are available for prediction for a current portion. The coding parameters for a current portion may include one or more of intra prediction parameters $50_1$, inter prediction parameters $48_1$, filter parameters for the further-processing module 32 and so forth. The correction data for correcting the prediction error may be represented by the spectral transform coefficient levels within residual data $42_1$. Not all of these of coding parameters need to transmitted in full. Some of them may have been spatially predicted from coding parameters of neighboring segments of video $14_1$. Motion vectors for video $14_1$, for example, may be transmitted within the bitstream as motion vector differences between motion vectors of neighboring portions/segments of video $14_1$.

As far as the second decoding branch $106_{d,i}$ is concerned, same has access not only to the residual data 422 and the corresponding prediction and filter parameters as signaled within the data stream 18 and distributed to the respective decoding branch $106_{d,i}$ by demultiplexer 104, i.e. the coding parameters not predicted by across inter-view boundaries, but also indirectly to the coding parameters and correction data provided via demultiplexer 104 to decoding branch $106_{v,i}$ or any information derivable therefrom, as distributed via coding information exchange module 110. Thus, the decoding branch $106_{d,i}$ determines its coding parameters for reconstructing the depth/disparity map data $16_1$ from a portion of the coding parameters forwarded via demultiplexer 104 to the pair of decoding branches $106_{v,i}$ and $106_{d,i}$ for the first view $12_1$, which partially overlaps the portion of these coding parameters especially dedicated and forwarded to the decoding branch $106_{v,i}$. For example, decoding branch $106_{d,i}$ determines motion vector 68a from motion vector 62a explicitly transmitted within 481, for example, as a motion vector difference to another neighboring portion of frame $v_{1,t}$, on the on hand, and a motion vector difference explicitly transmitted within $48_2$, on the on hand. Additionally, or alternatively, the decoding branch $106_{d,i}$ may use reconstructed portions of the video $14_1$ as described above with respect to the prediction of the wedgelet separation line to predict coding parameters for decoding depth/disparity map data $16_1$.

To be even more precise, the decoding branch $106_{d,i}$ reconstructs the depth/disparity map data $14_1$ of the first view $12_1$ from the data stream by use of coding parameters which are at least partially predicted from the coding parameters used by the decoding branch $106_{v,i}$ (or adopted therefrom) and/or predicted from the reconstructed portions of video $14_1$ in the decoded picture buffer 34 of the decoding branch $106_{v,i}$. Prediction residuals of the coding parameters may be obtained via demultiplexer 104 from the data stream 18. Other coding parameters for decoding branch $106_{d,i}$ may be transmitted within data stream 108 in full or with respect to another basis, namely referring to a coding parameter having been used for coding any of the previously reconstructed portions of depth/disparity map data $16_1$ itself. Based on these coding parameters, the decoding branch $106_{d,i}$ predicts a current portion of the depth/disparity map data $14_1$ from a previously reconstructed portion of the depth/disparity map data $16i$, reconstructed from the data stream 18 by the decoding branch $106_{d,i}$ prior to the reconstruction of the current portion of the depth/disparity map data $16_1$, and correcting a prediction error of the prediction of the current portion of the depth/disparity map data $16_1$ using the respective correction data $42_2$.

Thus, the data stream 18 may comprise for a portion such as portion 66a of the depth/disparity map data $16_1$, the following:

an indication as to whether, or as to which part of, the coding parameters for that current portion are to be adopted or predicted from corresponding coding parameters, for example, of a co-located and time-aligned portion of video $14_1$ (or from other video $14_1$ specific data such as the reconstructed version thereof in order to predict the wedgelet separation line), if so, in case of prediction, the coding parameter residual, if not, all coding parameters for the current portion, wherein same may be signaled as prediction residuals compared to coding parameters of previously reconstructed portions of the depth/disparity map data $16_1$ if not all coding parameters are to be predicted/adapted as mentioned above, a remaining part of the coding parameters for the current portion, wherein same may be signaled as prediction residuals compared to coding parameters of previously reconstructed portions of the depth/disparity map data $16_1$.

For example, if the current portion is an inter predicted portion such as portion 66a, the motion vector 68a may be signaled within the data stream 18 as being adopted or predicted from motion vector 62a. Further, decoding branch $106_{d,i}$ may predict the location of the wedgelet separation line 70 depending on detected edges 72 in the reconstructed portions of video $14_1$ as described above and apply this wedgelet separation line either without any signalization within the data stream 18 or depending on a respective application signalization within the data stream 18. In other words, the appliance of the wedgelet separation line prediction for a current frame may be suppressed or allowed by way of signalization within the data stream 18. In even other words, the decoding branch $106_{d,i}$ may effectively predict the circumference of the currently reconstructed portion of the depth/disparity map data.

The functionality of the pair of decoding branches $106_{v,2}$ and $106_{d,2}$ for the second view $12_2$ is, as already described above with respect to encoding, similar as for the first view $12_1$. Both branches cooperate to reconstruct the second view $12_2$ of the multi-view signal 10 from the data stream 18 by use of own coding parameters. Merely that part of these coding parameters needs to be transmitted and distributed via demultiplexer 104 to any of these two decoding branches $106_{v,2}$ and $106_{d,2}$, which is not adopted/predicted across the view boundary between views $14_1$ and $14_2$, and, optionally, a residual of the inter-view predicted part. Current portions of the second view $12_2$ are predicted from previously reconstructed portions of the multi-view signal 10, reconstructed from the data stream 18 by any of the decoding branches 106 prior to the reconstruction of the respective current portions of the second view $12_2$, and correcting the prediction error accordingly using the correction data, i.e. $42_3$ and $42_4$, forwarded by the demultiplexer 104 to this pair of decoding branches $106_{v,2}$ and $106_{d,2}$.

The decoding branch $106_{v,2}$ is configured to at least partially adopt or predict its coding parameters from the coding parameters used by any of the decoding branches $106_{v,i}$ and $106_{d,i}$. The following information on coding parameters may be present for a current portion of the video $14_2$:

an indication as to whether, or as to which part of, the coding parameters for that current portion are to be adopted or predicted from corresponding coding parameters, for example, of a co-located and time-aligned portion of video $14_1$ or depth/disparity data $16_1$, if so, in case of prediction, the coding parameter residual, if not, all coding parameters for the current portion, wherein same may be signaled as prediction residuals compared to coding parameters of previously reconstructed portions of the video $14_2$ if not all coding parameters are to be predicted/adapted as mentioned above, a remaining part of the coding parameters for the current portion, wherein same may be signaled as prediction residuals compared to coding parameters of previously reconstructed portions of the video $14_2$.

a signalization within the data stream 18 may signalize for a current portion 74a whether the corresponding coding parameters for that portion, such as motion vector 78, is to be read from the data stream completely anew, spatially predicted or predicted from a motion vector of a co-located portion of the video $14_1$ or depth/disparity map data $16_1$ of the first view $12_1$ and the decoding branch $106_{v,2}$ may act accordingly, i.e. by extracting motion vector 78 from the data stream 18 in full, adopting or predicting same with, in the latter case, extracting prediction error data regarding the coding parameters for the current portion 74a from the data stream 18.

Decoding branch $106_{d,2}$ may act similarly. That is, the decoding branch $106_{d,2}$ may determine its coding parameters at last partially by adoption/prediction from coding parameters used by any of decoding branches $106_{v,i}$, $106_{d,i}$ and $106_{v,2}$, from the reconstructed video $14_2$ and/or from the reconstructed depth/disparity map data $16_1$ of the first view $12_1$. For example, the data stream 18 may signal for a current portion 80b of the depth/disparity map data $16_2$ as to whether, and as to which part of, the coding parameters for this current portion 80b is to be adopted or predicted from a co-located portion of any of the video $14_1$, depth/disparity map data $16_1$ and video $14_2$ or a proper subset thereof. The part of interest of these coding parameters may involve, for example, a motion vector such as 84, or a disparity vector such as disparity vector 82. Further, other coding parameters, such as regarding the wedgelet separation lines, may be derived by decoding branch $106_{d,2}$ by use of edge detection within video $14_2$. Alternatively, edge detection may even be applied to the reconstructed depth/disparity map data $16_1$ with applying a predetermined re-projection in order to transfer the location of the detected edge in the depth/disparity map $d_{1,t}$ to the depth/disparity map $d_{2,t}$ in order to serve as a basis for a prediction of the location of a wedgelet separation line.

In any case, the reconstructed portions of the multi-view data 10 arrive at the view extractor 108 where the views contained therein are the basis for a view extraction of new views, i.e. the videos associated with these new views, for example. This view extraction may comprise or involve a re-projection of the videos $14_1$ and $14_2$ by using the depth/disparity map data associated therewith. Frankly speaking, in re-projecting a video into another intermediate view, portions of the video corresponding to scene portions positioned nearer to the viewer are shifted along the disparity direction, i.e. the direction of the viewing direction difference vector, more than portions of the video corresponding to scene portions located farther away from the viewer position. An example for the view extraction performed by view extractor 108 is outlined below with respect to FIGS. 4-6 and 8. Disocclusion handling may be performed by view extractor as well.

However, before describing further embodiments below, it should be noted that several amendments may be performed with respect to the embodiments outlined above. For example, the multi-view signal 10 does not have to necessarily comprise the depth/disparity map data for each view. It is even possible that none of the views of the multi-view signal 10 has a depth/disparity map data associated therewith. Nevertheless, the coding parameter reuse and sharing among the multiple views as outlined above yields a coding efficiency increase. Further, for some views, the depth/disparity map data may be restricted to be transmitted within the data stream to disocclusion areas, i.e. areas which are to fill disoccluded areas in re-projected views from other views of the multi-vie signal with being set to a don't care value in the remaining areas of the maps.

As already noted above, the views $12_1$ and $12_2$ of the multi-view signal 10 may have different spatial resolutions. That is, they may be transmitted within the data stream 18 using different resolutions. In even other words, the spatial resolution at which coding branches $22_{v,i}$ and $22_{d,i}$ perform the predictive coding may be higher than the spatial resolution at which coding branches $22_{v,2}$ and $22_{d,2}$ perform the predictive coding of the subsequent view $12_2$ following view $12_1$ in the above-mentioned order among the views. The inventors of the present invention found out that this measure additionally improves the rate/distortion ratio when considering the quality of the synthesized views 102. For example, the encoder of FIG. 1 could receive view $12_1$ and view $12_2$ initially at the same spatial resolution with then, however, down-sampling the video $14_2$ and the depth/disparity map data $16_2$ of the second view $12_2$ to a lower spatial resolution prior to subjecting same to the predictive encoding procedure realized by modules 24 to 40. Nevertheless, the above-mentioned measures of adoption and prediction of coding parameters across view boundaries could still be performed by scaling the coding parameters forming the basis of adoption or prediction according to the ratio between the different resolutions of source and destination view. See, for example, FIG. 2. If coding branch $22_{v,2}$ intends to adopt or predict motion vector 78 from any of motion vector 62a and 68a, then coding branch $22_{v,2}$ would down-scale them by a value corresponding to the ratio between the high spatial resolution of view $12i$, i.e. the source view, and the low spatial resolution of view $12_2$, i.e. the destination view. Naturally, the same applies with regard to the decoder and the decoding branches 106. Decoding branches $106_{v,2}$ and $106_{d,2}$ would perform the predictive decoding at the lower spatial resolution relative to decoding branches $106_{v,i}$ and $106_{d,i}$. After reconstruction, up-sampling would be used in order to transfer the reconstructed pictures and depth/disparity maps output by the decoding picture buffers 34 of decoding branches $106_{v,2}$ and $106_{d,2}$ from the lower spatial resolution to the higher spatial resolution before the latter reach view extractor 108. A respective up-sampler would be positioned between the respective decoded picture buffer and the respective input of view extractor 108. As mentioned above, within one view $12_1$ or $12_2$, video and associated depth/disparity map data may have the same spatial resolution. However, additionally or alternatively, these pairs have different spatial resolution and the measures described just above are performed across spatial resolution boundaries, i.e. between depth/disparity map data and video. Further, according to another embodiment, there would be three views including view $12_3$, not shown in FIGS. 1 to 3 for illustration purposes, and while the first and second views would have the same spatial resolution, the third view $12_3$ would have the lower spatial resolution. Thus, according to the just-described embodiments, some subsequent views, such as view $12_2$, are down-sampled before encoding and up-sampled after decoding. This sub- and up-sampling, respectively, represents a kind of pre- or postprocessing of the de/coding branches, wherein the coding parameters used for adoption/prediction of coding parameters of any subsequent (destination) view are scaled according to the respective ratio of the spatial resolutions of the source and destination views. As already mentioned above, the lower quality at which these subsequent views, such as view $12_2$, are transmitted and predictively coded, does not significantly affect the quality of the intermediate view output 102 of intermediate view extractor 108 due to the processing within intermediate view extractor 108. View extractor 108 performs a kind of interpolation/lowpass filtering on the videos $14_1$ and $14_2$ anyway due to the re-projection into the intermediate view(s) and the necessitated re-sampling of the re-projected video sample values onto the sample grid of the intermediate view(s). In order to exploit the fact that the first view $12_1$ has been transmitted at an increased spatial resolution relative to the neighboring view $12_2$, the intermediate views therebetween may be primarily obtained from view $12_1$, using the low spatial resolution view $12_2$ and its video $14_2$ merely as a subsidiary view such as, for example, merely for filling the disocclusion areas of the re-projected version of video $14_1$, or merely participating at a reduced weighting factor when performing some averaging between re-projected version of videos of view $12_1$ on the one hand and $12_2$ on the other hand. By this measure, the lower spatial resolution of view $12_2$ is compensated for although the coding rate of the second view $12_2$ has been significantly reduced due to the transmission at the lower spatial resolution.

It should also be mentioned that the embodiments may be modified in terms of the internal structure of the coding/decoding branches. For example, the intra-prediction modes may not be present, i.e. no spatial prediction modes may be available. Similarly, any of interview and temporal prediction modes may be left away. Moreover, all of the further processing options are optional. On the other hand, out-of-loop postprocessing modules maybe present at the outputs of decoding branches 106 in order to, for example, perform adaptive filtering or other quality enhancing measures and/or the above-mentioned up-sampling. Further, no transformation of the residual may be performed. Rather, the residual may be transmitted in the spatial domain rather than the frequency domain. In a more general sense, the hybrid coding/decoding designs shown in FIGS. 1 and 3 may be replaced by other coding/decoding concepts such as wavelet transform based ones.

It should also be mentioned that the decoder does not necessarily comprise the view extractor 108. Rather, view extractor 108 may not be present. In this case, the decoder 100 is merely for reconstructing any of the views $12_1$ and $12_2$, such as one, several or all of them. In case no depth/disparity data is present for the individual views $12_1$ and $12_2$, a view extractor 108 may, nevertheless, perform an intermediate view extraction by exploiting the disparity vectors relating corresponding portions of neighboring views to each other. Using these disparity vectors as supporting disparity vectors of a disparity vector field associated with videos of neighboring views, the view extractor 108 may build an intermediate view video from such videos of neighboring views $12_1$ and $12_2$ by applying this disparity vector field. Imagine, for example, that video frame $V_{2,t}$ had 50% of its portions/segments interview predicted. That is, for 50% of the portions/segments, disparity vectors would exist. For the remaining portions, disparity vectors could be determined by the view extractor 108 by way of interpolation/extrapolation in the spatial sense. Temporal interpolation using disparity vectors for portions/segments of previously reconstructed frames of video $14_2$ may also be used. Video frame $v_{2,t}$ and/or reference video frame $v_{1,t}$, may then be distorted according to these disparity vectors in order to yield an intermediate view. To this end, the disparity vectors are scaled in accordance with the intermediate view position of the intermediate view between view positions of the first view $12_1$ and a second view $12_2$. Details regarding this procedure are outlined in more detail below.

A coding efficiency gain is obtained by using the above-mentioned option of determining wedgelet separation lines so as to extend along detected edges in a reconstructed current frame of the video. Thus, as explained above the wedeglet separation line position prediction described above may be used for each of the views, i.e. all of them or merely a proper subset thereof.

Insofar, the above discussion of FIG. 3 also reveals a decoder having a decoding branch $106_{c,i}$ configured to reconstruct a current frame $v_{1,t}$ of a video $14_1$ from a data stream 18, and a decoding branch $106_{d,i}$ configured to detect an edge 72 in the reconstructed current frame $v_{1,t}$, determine a wedgelet separation line 70 so as to extend along the edge 72, and reconstruct a depth/disparity map $d_{1,t}$ associated with the current frame $v_{1,t}$ in units of segments 66a, 66b, 72a, 72b of a segmentation of the depth/disparity map $d_{1,t}$ in which two neighboring segments 72a, 72b of the segmentation are separated from each other by the wedgelet separation line 70, from the data stream 18. The decoder may be configured to predict the depth/disparity map $d_{1,t}$ segment-wise using distinct sets of prediction parameters for the segments, from previously reconstructed segments of the depth/disparity map $d_{1,t}$ associated with the current frame $v_{1,t}$, or a depth/disparity map di t-i associated with any of the previously decoded frames $v_{t-1}$ of the video. The decoder may be configured such that the wedgelet separation line 70 is a straight line and the decoder is configured to determine the segmentation from a block based pre-segmentation of the depth/disparity map $d_{1,t}$ by dividing a block 66c of the pre-segmentation along the wedgelet separation line 70 so that the two neighboring segments 72a, 72b are wedgelet-shaped segments together forming the block 66c of the pre-segmentation.

Summarizing some of the above embodiments, these embodiments enable view extraction from commonly decoding multi-view video and supplementary data. The term "supplementary data" is used in the following in order to denote depth/disparity map data. According to these embodiments, the multi-view video and the supplementary data is embedded in one compressed representation. The supplementary data may consist of per-pixel depth maps, disparity data or 3D wire frames. The extracted views 102 can be different from the views $12_1$, $12_2$ contained in the compressed representation or bitstream 18 in terms of view number and spatial position. The compressed representation 18 has been generated before by an encoder 20, which might use the supplementary data to also improve the coding of the video data.

In contrast to current state-of-the-art methods, a joint decoding is carried out, where the decoding of video and supplementary data may be supported and controlled by common information. Examples are a common set of motion or disparity vectors, which is used to decode the video as well as the supplementary data. Finally, views are extracted from the decoded video data, supplementary data and possible combined data, where the number and position of extracted views is controlled by an extraction control at the receiving device.

Figure 4:
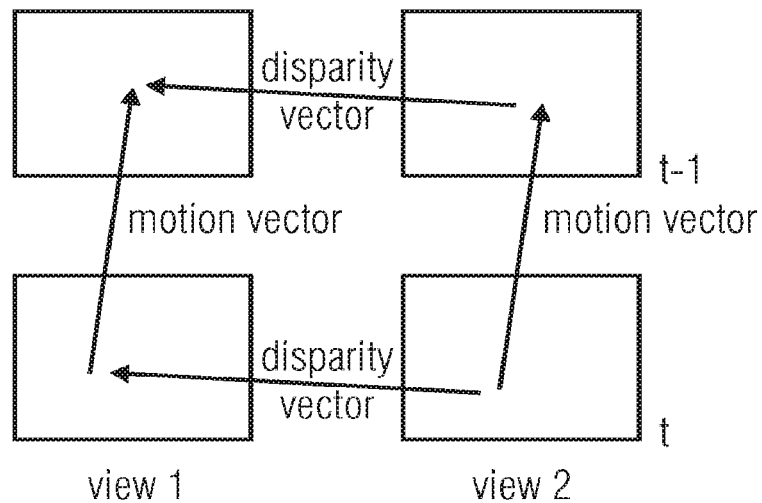
FIG. 4 Prediction structure and motion/disparity vectors in multi-view coding on the example of two views and two time instances.

Further, the multi-view compression concept described above is useable in connection with disparity-based view synthesis. Disparity-based view synthesis means the following. If scene content is captured with multiple cameras, such as the videos $14_1$ and $14_2$, a 3D perception of this content can be presented to the viewer. For this, stereo pairs have to be provided with slightly different viewing direction for the left and right eye. The shift of the same content in both views for equal time instances is represented by the disparity vector. Similar to this, the content shift within a sequence between different time instances is the motion vector, as shown in FIG. 4 for two views at two time instances.

Usually, disparity is estimated directly or as scene depth, provided externally or recorded with special sensors or cameras. Motion estimation is already carried out by a standard coder. If multiple views are coded together, the temporal and inter-view direction are treated similarly, such that motion estimation is carried out in temporal as well as interview direction during encoding. This has already been described above with respect to FIGS. 1 and 2. The estimated motion vectors in inter-view direction are the disparity vectors. Such disparity vectors were shown in FIG. 2 exemplarily at 82 and 76. Therefore, encoder 20 also carries out disparity estimation implicitly and the disparity vectors are included in the coded bitstream 18. These vectors can be used for additional intermediate view synthesis at the decoder, namely within view extractor 108.

Consider a pixel $p_1(x_1,y_1)$ in view 1 at position $(x_1,y_1)$ and a pixel $p_2(x_2,y_2)$ in view 2 at position $(x_2,y_2)$, which have identical luminance values. Then, $$p_1(x_1,y_1)=p_2(x_2,y_2). \quad (1)$$

Their positions $(x_1,y_1)$ and $(X_2,y_2)$ are connected by the 2D disparity vector, e.g. from view 2 to view 1, which is $d_{21}(x_2,y_2)$ with components $d_{x,21}(x_2,y_2)$ and $d_{y,21}(x_2,y_2)$. Thus, the following equation holds:

$$(x_1,y_1)=(x_2+d_{x,21}(x_2,y_2),y_2+d_{y,21}(x_2,y_2)). \quad (2)$$

Combining (1) and (2), $$P_1(x_2+d_{x,21}(x_2,y_2),y_2+d_{y,21}(x_2,y_2))=p_2(x_2,y_2). \quad (3)$$

Figure 5:
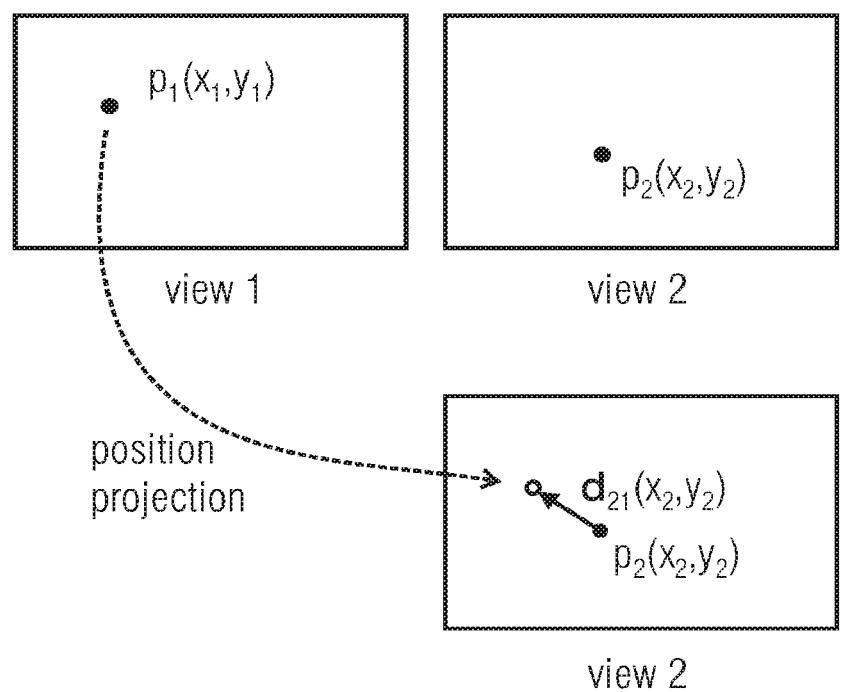
FIG. 5 Point correspondences by disparity vector between adjacent views.
Figure 6:
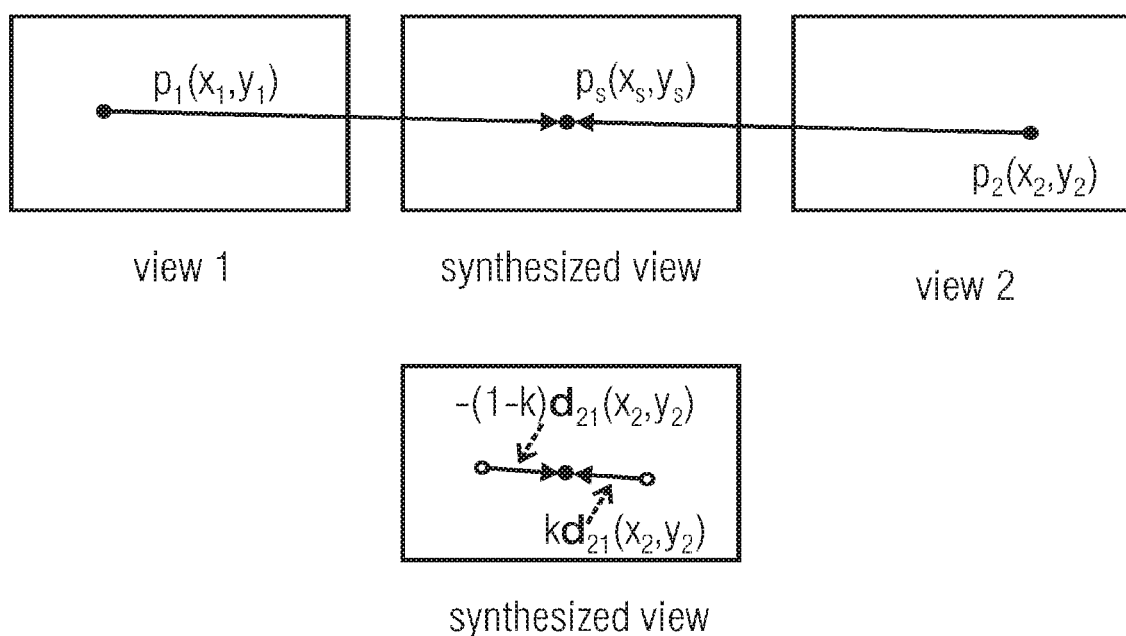
FIG. 6 Intermediate view synthesis by scene content projection from views 1 and 2, using scaled disparity vectors.

As shown in FIG. 5, bottom right, two points with identical content can be connected with a disparity vector: Adding this vector to the coordinates of $p_2$, gives the position of pi in image coordinates. If the disparity vector $d_{21}(x_2,y_2)$ is now scaled by a factor $K=[0 \ldots 1]$, any intermediate position between $(x_1,y_1)$ and $(x_2,y_2)$ can be addressed. Therefore, intermediate views can be generated by shifting the image content of view 1 and/or view 2 by scaled disparity vectors. An example is shown in FIG. 6 for an intermediate view.

Therefore, new intermediate views can be generated with any position between view 1 and view 2.

Beyond this, also view extrapolation can also be achieved by using scaling factors $K<0$ and $K>1$ for the disparities.

These scaling methods can also be applied in temporal direction, such that new frames can be extracted by scaling the motion vectors, which leads to the generation of higher frame rate video sequences.

Now, returning to the embodiments described above with respect to FIGS. 1 and 3, these embodiments described, inter alia, a parallel decoding structure with decoders for video and supplementary data such as depth maps, that contain a common information module, namely module 110. This module uses spatial information from both signals that was generated by an encoder. Examples for common are one set of motion or disparity vectors, e.g. extracted in the video data encoding process, which is also used for depth data, for example. At the decoder, this common information is used for steering the decoding video and depth data and providing the necessitated information to each decoder branch as well as, optionally, for extracting new views. With this information, all necessitated views, e.g. for an N-view display, can be extracted in parallel from the video data. Examples for common information or coding parameters to be shared among the individual coding/decoding branches are:

Common motion and disparity vectors, e.g. from the video data that is also used for the supplementary data Common block partitioning structure, e.g. from the video data partitioning that is also used for the supplementary data Prediction modes Edge and contour data in luminance and/or chrominance information, e.g. a straight line in a luminance block. This is used for supplementary data non-rectangular block partitioning. This partitioning is called wedgelet and separates a block into two regions by a straight line with certain angle and position The common information may also be used as a predictor from one decoding branch (e.g. for video) to be refined in the other branch (e.g. supplementary data) and vice versa. This may include e.g. refinement of motion or disparity vectors, initialization of block structure in supplementary data by the block structure of video data, extracting a straight line from the luminance or chrominance edge or contour information from a video block and using this line for a wedgelet separation line prediction (with same angle but possibly different position in the corresponding depth block keeping the angle. The common information module also transfers partially reconstructed data from one decoding branch to the other. Finally, data from this module may also be handed to the view extraction module, where all necessitated views, e.g. for a display are extracted (displays can be 2D, stereoscopic with two views, autostereoscopic with N views).

One important aspect is that if more than one single pair of view and depth/supplementary signal is encoded/decoded by using the above described en/decoding structure, an application scenario may be considered where we have to transmit for each time instant t a pair of color views $v_{Color\_}1(t)$, $v_{Color\_}2(t)$ together with the corresponding depth data $v_{Depth\_}1(t)$ and $v_{Depth\_}2(f)$. The above embodiments suggest encoding/decoding first the signal $v_{Color\_}1(t)$, e.g., by using conventional motion-compensated prediction. Then, in a second step, for encoding/decoding of the corresponding depth signal $v_{Depth\_}1(f)$ information from the encoded/decoded signal $v_{Color\_}1(t)$ can be reused, as outlined above. Subsequently, the accumulated information from $v_{Color\_}1(t)$ and $v_{Depth\_}1(t)$ can be further utilized for encoding/decoding of $v_{Color\_}2(t)$ and/or $v_{Depth\_}2(t)$. Thus, by sharing and reusing common information between the different views and/or depths redundancies can be exploited to a large extent.

Figure 7:
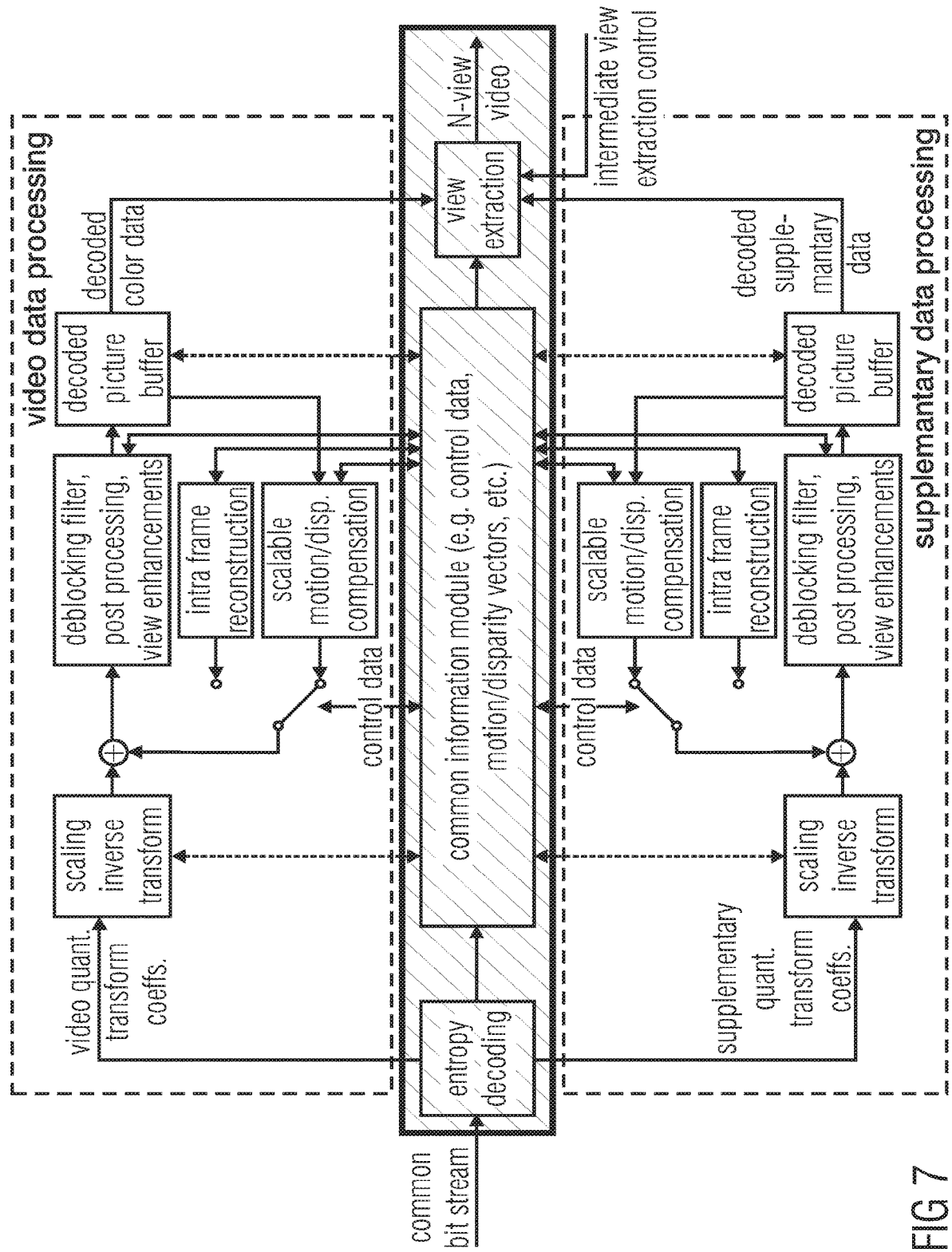
FIG. 7 N-view extraction from separately decoded color and supplementary data for generating intermediate views at arbitrary viewing positions.

The decoding and view extraction structure of FIG. 3 may alternatively be illustrated as shown in FIG. 7.

As shown, the structure of the decoder of FIG. 7 is based on two parallelized classical video decoding structures for color and supplementary data. In addition, it contains a Common Information Module. This module can send, process and receive any shared information from and to any module of both decoding structures. The decoded video and supplementary data are finally combined in the View Extraction Module in order to extract the necessitated number of views. Here, also common information from the new module may be used. The new modules of the newly proposed decoding and view extraction method are highlighted by the gray box in FIG. 7.

The decoding process starts with receiving a common compressed representation or bit stream, which contains video data, supplementary data as well as information, common to both, e.g. motion or disparity vectors, control information, block partitioning information, prediction modes, contour data, etc. from one or more views.

First, an entropy decoding is applied to the bit stream to extract the quantized transform coefficients for video and supplementary data, which are fed into the two separate coding branches, highlighted by the doted grey boxes in FIG. 7, labeled "Video Data processing" and "Supplementary Data Processing". Furthermore, the entropy decoding also extracts shared or common data and feeds it into the new Common Information Module.

Both decoding branches operate similar after entropy decoding. The received quantized transform coefficients are scaled and an inverse transform is applied to obtain the difference signal. To this, previously decoded data from temporal or neighboring views is added. The type of information to be added is controlled by special control data: In the case of intra coded video or supplementary data, no previous or neighboring information is available, such that intra frame reconstruction is applied. For inter coded video or supplementary data, previously decoded data from temporally preceding or neighboring views is available (current switch setting in FIG. 7). The previously decoded data is shifted by the associated motion vectors in the motion compensation block and added to the difference signal to generate initial frames. If the previously decoded data belongs to a neighboring view, the motion data represents the disparity data. These initial frames or views are further processed by deblocking filters and possibly enhancement methods, e.g. edge smoothing, etc. to improve the visual quality.

After this improvement stage, the reconstructed data is transferred to the decoded picture buffer. This buffer orders the decoded data and outputs the decoded pictures in the correct temporal order for each time instance. The stored data is also used for the next processing cycle to serve as input to the scalable motion/disparity compensation.

In addition to this separate video and supplementary decoding, the new Common Information Module is used, which processes any data, which is common to video and supplementary data. Examples of common information include shared motion/disparity vectors, block partitioning information, prediction modes, contour data, control data, but also common transformation coefficients or modes, view enhancement data, etc. Any data, which is processed in the individual video and supplementary modules, may also be part of the common module. Therefore, connections to and from the common module to all parts of the individual decoding branches may exist. Also, the common information module may contain enough data, that only one separate decoding branch and the common module are necessitated in order to decoded all video and supplementary data. An example for this is a compressed representation, where some parts only contain video data and all other parts contain common video and supplementary data. Here, the video data is decoded in the video decoding branch, while all supplementary data is processed in the common module and output to the view synthesis. Thus, in this example, the separate supplementary branch is not used. Also, individual data from modules of the separate decoding branches may send information back to the Common Information Processing module, e.g. in the form of partially decoded data, to be used there or transferred to the other decoding branch. An example is decoded video data, like transform coefficients, motion vectors, modes or settings, which are transferred to the appropriate supplementary decoding modules.

After decoding, the reconstructed video and supplementary data are transferred to the view extraction either from the separate decoding branches or from the Common Information Module. In the View Extraction Module, such as 110 in FIG. 3, the necessitated views for a receiving device, e.g. multi-view display, are extracted. This process is controlled by the intermediate view extraction control, which sets the necessitated number and position of view sequences. An example for view extraction is view synthesis: If a new view is to be synthesized between two original views 1 and 2, as shown in FIG. 6, data from view 1 may be shifted to the new position first. This disparity shift however is different for foreground and background objects, as the shift is inverse proportional to the original scene depth (frontal distance from the camera). Therefore, new background areas become visible in the synthesized view, which were not visible in view 1. Here, view 2 can be used to fill this information. Also, spatially neighboring data may be used, e.g. adjacent background information.

Figure 8:
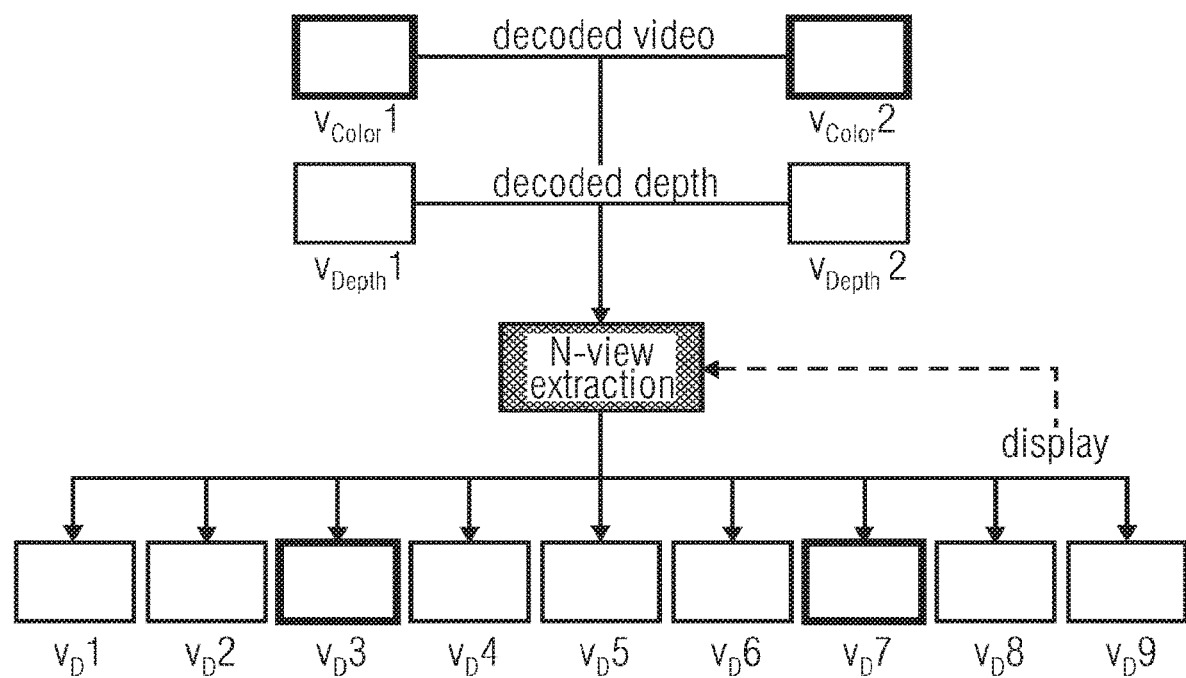
FIG. 8 N-view extraction example of a two-view bitstream for a 9 view display.

As an example, consider the setting in FIG. 8. Here, the decoded data consists of 2 view sequences with color data $v_{Color}1$ and $v_{Color}2$, as well as depth data $v_{Depth}1$ and $v_{Depth}2$. From this data, views for a 9 view display with views $v_D 1, v_D 2, \ldots, v_D 9$ shall be extracted. The display signals the number and spatial position of views via the intermediate view extraction control. Here, 9 views are necessitated with a spatial distance of 0.25, such that neighboring display views (e.g. $v_D 2$ and $v_D 3$) are 4 times closer together in terms of spatial position and stereoscopic perception than the views in the bit stream. Therefore, the set of view extraction factors $\{k_1, k_2, \ldots, k_9\}$ is set to $\{-0.5, -0.25, 0, 0.25, 0.5, 0.75, 1, 1.25, 1.5\}$. This indicates that the decoded color views $v_{Color}1$ and $v_{Color}2$ coincident in their spatial position with the display views $v_D 3$ and $v_D 7$ (as $k_3=0$ and $k_7=1$). Furthermore, $v_D 3$, $v_D 4$ and $v_D 5$ are interpolated between $v_{Color}1$ and $v_{Color}2$. Finally, $v_D 1$ and $v_D 2$ as well as $v_D 8$ and $v_D 9$ are extrapolated at each side of the bit stream pair $v_{Color}1$, $v_{Color}2$. With the set of view extraction factors, the depth data $v_{Depth}1$ and $v_{Depth}2$ is transformed into per pixel displacement information and scaled accordingly in the view extraction stage in order to obtain 9 differently shifted versions of the decoded color data.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

The inventive encoded multi-view signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed:

1. A decoder for decoding an encoded video data stream to generate a multi-view video, the decoder comprising: a view decoder configured for:
  extracting, from a data stream using a processor, first information associated with a first coding block in a first view of a multi-view video signal, wherein the first information is indicative of whether a motion parameter of the first coding block is to (a) be read from the data stream independent of another coding parameter, or (b) reuse one or more coding parameters of a second coding block located in a second view of the multi-view video signal;
  if the first information indicates that the motion parameter of the first coding block is to be read from the data stream independent of another coding parameter, extracting, using the processor, the motion parameter of the first coding block from the data stream;
  if the first information indicates that the motion parameter of the first coding block is to reuse the one or more coding parameters from the second coding block in the second view:
    receiving, using the processor, the one or more coding parameters including a motion parameter of the second coding block,
    predicting, using the processor, the motion parameter of the first coding block based on the motion parameter of the second coding block, and
    extracting prediction error data associated with the motion parameter of the first coding block;
  generating, using the processor, a prediction of the first coding block based on (i) the extracted or predicted motion parameter of the first coding block, and (ii) the prediction error data if the first information indicates that the motion parameter of the first coding block is to reuse the one or more coding parameters;
  obtaining, from the data stream using the processor, residual data associated with the first coding block; and
  reconstructing, using the processor, the first coding block using the prediction of the first coding block and the residual data to produce a part of a video frame in the first view of the multi-view video.

2. The decoder of claim 1, wherein each of the first and second views comprises different types of information components.

3. The decoder of claim 2, wherein the different types of information components include a video and a depth map corresponding to the video.

4. The decoder of claim 3, wherein the first coding block comprises video data and is reconstructed based on a first subset of the one or more coding parameters from the second coding block.

5. The decoder of claim 4, wherein the first coding block comprises depth data and is reconstructed based on a second subset of the one or more coding parameters from the second coding block.

6. The decoder of claim 3, wherein the view decoder is further configured for: reconstructing a first depth coding block in the first view based on a first edge associated with the first depth coding block, the decoder further comprising another view decoder configured for:
  predicting a second edge associated with a second depth coding block of the second view based on the first edge; and
  reconstructing the second depth coding block of the second view based on the second edge.

7. The decoder of claim 1, wherein the first coding block is reconstructed in accordance with a first spatial resolution and the second coding block is reconstructed in accordance with a second spatial resolution.

8. The decoder of claim 1, wherein the decoder is further configured to generate an intermediate coding block based on the first and the second coding blocks.

9. The decoder of claim 1, wherein the decoder is further configured to generate an intermediate view based on the first and second views.

10. The decoder of claim 1, wherein the first information is further indicative of whether a motion parameter of the first coding block is to be predicted from a motion parameter of a previously-reconstructed portion of the first view, and if so, the view decoder is configured for:
obtaining, using the processor, the motion parameter of the previously-reconstructed portion, and
predicting, using the processor, the motion parameter of the first coding block based on the motion parameter of the previously-reconstructed portion.

11. The decoder of claim 1, wherein the one or more coding parameters include video parameters and depth parameters both associated with the second coding block in the second view.

12. An encoder configured for encoding, into a data stream, a multi-view video, the encoder comprising:
a view encoder configured for
encoding, into the data stream using a processor, first information associated with a first coding block in a first view of a multi-view video signal, wherein the first information is indicative of whether a motion parameter of the first coding block is to (a) be read from the data stream independent of another coding parameter, or (b) reuse one or more coding parameters of a second coding block located in a second view of the multi-view video signal; and
encoding, into the data stream using the processor, the motion parameter of the first coding block, if the first information indicates that the motion parameter of the first coding block is to be read from the data stream independent of another coding parameter;
encoding, into the data stream using the processor, the one or more coding parameters including a motion parameter of the second coding block in the second view and prediction error data associated with the motion parameter of the first coding block, if the first information indicates that the motion parameter of the first coding block is to reuse the one or more coding parameters from the second coding block in the second view;
generating, using the processor, a prediction of the first coding block based at least on the motion parameter of the first coding block;
determining, using the processor, residual data associated with the first coding block based on a difference of the first coding block and the prediction of the first coding block; and
encoding, into the data stream using the processor, the residual data associated with the first coding block,
wherein the first coding block is reconstructed using the prediction of the first coding block, the prediction error data and the residual data to produce a part of a video frame in the first view of the multi-view video.

13. The encoder of claim 12, wherein the first information is further indicative of whether a motion parameter of the first coding block is to be predicted from a motion parameter of a previously-reconstructed portion of the first view, and if so, the view encoder is configured for encoding, into the data stream using the processor, the motion parameter of the previously-reconstructed portion.

14. The encoder of claim 12, wherein each of the first and second views comprises different types of information components.

15. The encoder of claim 14, wherein the different types of information components include a video and a depth map corresponding to the video.

16. The encoder of claim 15, wherein the first coding block comprises video data and is reconstructed based on a first subset of the one or more coding parameters from the second coding block.

17. The encoder of claim 16, wherein the first coding block comprises depth data and is reconstructed based on a second subset of the one or more coding parameters from the second coding block.

18. The encoder of claim 12, wherein the encoder is further configured to encode an intermediate view based on the first and second views.

19. A non-transitory computer-readable storage medium configured to store information comprising a data stream representing an encoded multi-view video and including:
encoded first information associated with a first coding block in a first view of a multi-view signal, wherein the first coding block represents a part of a video frame in the first view and the first information is indicative of whether a motion parameter of the first coding block is to (a) be read from the data stream independent of another coding parameter, or (b) reuse one or more coding parameters of a second coding block located in a second view of the multi-view video signal;
an encoded motion parameter of the first coding block, if the first information indicates that the motion parameter of the first coding block is to be read from the data stream independent of another coding parameter;
encoded one or more coding parameters including a motion parameter of the second coding block in the second view and prediction error data associated with the motion parameter of the first coding block, if the first information indicates that the motion parameter of the first coding block is to reuse the one or more coding parameters from the second coding block in the second view; and
encoded residual data associated with the first coding block based on a difference of the first coding block and a prediction of the first coding block, wherein the prediction of the first coding block is determined using the motion parameter of the first coding block,
wherein the first coding block is reconstructed using the prediction of the first coding block, the prediction error data and the residual data to produce the part of the video frame in the first view of the multi-view video.

20. The non-transitory computer-readable storage medium of claim 19, wherein the first information is further indicative of whether a motion parameter of the first coding block is to be predicted from a motion parameter of a previously-reconstructed portion of the first view, and if so, the data stream further includes an encoded motion parameter of the previously-reconstructed portion.

* * * * *